United States Patent
Fan et al.

(10) Patent No.: US 10,405,206 B2
(45) Date of Patent: Sep. 3, 2019

(54) SERVICE REDUNDANCY METHOD AND RELATED APPARATUS

(71) Applicant: Huawei Technologies Co., Ltd., Shenzhen (CN)

(72) Inventors: Yu Fan, Shanghai (CN); Xiaoji Sun, Shanghai (CN); Bo Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 15/664,986

(22) Filed: Jul. 31, 2017

(65) Prior Publication Data
US 2017/0332257 A1    Nov. 16, 2017

Related U.S. Application Data

(63) Continuation of application No. PCT/CN2015/072051, filed on Jan. 30, 2015.

(51) Int. Cl.
  *H04L 12/26* (2006.01)
  *H04W 24/02* (2009.01)
  *H04W 8/08* (2009.01)

(52) U.S. Cl.
  CPC ............. *H04W 24/02* (2013.01); *H04W 8/08* (2013.01)

(58) Field of Classification Search
  CPC .......... H04L 12/24; H04W 8/08; H04W 8/18; H04W 8/26; H04W 8/30; H04W 24/02
  See application file for complete search history.

(56) References Cited

U.S. PATENT DOCUMENTS 8,200,220 B2 *   6/2012   Guo .................. H04L 29/12207
                                                   455/435.1
8,331,224 B2 *  12/2012   Meirosu ................ H04W 28/08
                                                     370/229
(Continued)

FOREIGN PATENT DOCUMENTS

CN    103238345 A    8/2013
CN    103535103 A    1/2014
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401, V13.1.0, Dec. 2014, 310 pages.
(Continued)

*Primary Examiner* — Frank Duong
(74) *Attorney, Agent, or Firm* — Conley Rose, P.C.

(57) ABSTRACT

A service redundancy method and a related apparatus, where the method includes sending, by a mobility management entity (MME), a request message to a domain name system (DNS) server, receiving a request response message sent including MME codes (MMECs) of all MMEs in the MME pool, determining a backup MME of the MME according to the MMECs of all the MMEs in the MME pool, sending an interface request message to the DNS server, where the interface request message includes an MMEC of the backup MME and the pool identity of the MME pool, receiving an interface response message from the DNS server, where the interface response message includes interface information of the backup MME, and sending, according to the interface information of the backup MME, user information of user equipment UE attached to the MME to the backup MME.

20 Claims, 8 Drawing Sheets

(56) References Cited

U.S. PATENT DOCUMENTS

| | | | |
|---|---|---|---|
| 8,375,245 | B2 | 2/2013 | Chang et al. |
| 8,700,002 | B2* | 4/2014 | Lopez .................. H04W 12/08 370/221 |
| 8,908,603 | B2* | 12/2014 | Olsson .................... H04W 8/30 370/221 |
| 2010/0220656 | A1* | 9/2010 | Ramankutty ......... H04L 45/025 370/328 |
| 2011/0176413 | A1* | 7/2011 | Tanabe ................. H04W 68/00 370/225 |
| 2011/0235505 | A1 | 9/2011 | Eswara et al. |
| 2012/0023360 | A1 | 1/2012 | Chang et al. |
| 2013/0083650 | A1* | 4/2013 | Taleb ..................... H04W 8/30 370/218 |
| 2013/0235805 | A1* | 9/2013 | Yang ..................... H04W 76/10 370/328 |
| 2018/0279174 | A1* | 9/2018 | Yannick ................ H04W 8/065 |

FOREIGN PATENT DOCUMENTS

| | | |
|---|---|---|
| EP | 2418890 A1 | 2/2012 |
| EP | 2615874 A1 | 7/2013 |
| JP | 2011211710 A | 10/2011 |
| KR | 20110064407 A | 6/2011 |
| WO | 2011110109 A2 | 9/2011 |
| WO | 2012071695 A1 | 6/2012 |

OTHER PUBLICATIONS

Foreign Communication From a Counterpart Application, Japanese Application No. 2017-540599, Japanese Notice of Rejection dated Sep. 25, 2018, 3 pages.
Foreign Communication From a Counterpart Application, Japanese Application No. 2017-540599, English Translation of Japanese Notice of Rejection dated Sep. 25, 2018, 4 pages.
Machine Translation and Abstract of Chinese Publication No. CN103535103, Jan. 22, 2014, 2 pages.
Foreign Communication From a Counterpart Application, Chinese Application No. 201580001104.7, Chinese Office Action dated Aug. 3, 2018, 9 pages.
Machine Translation and Abstract of International Publication No. WO2011110109, Sep. 15, 2011, 30 pages.
Barton, B., "How MME is selected—MME Selection procedure," XP055426981, LTE and Beyond, Mar. 6, 2013, 4 pages.
Foreign Communication From a Counterpart Application, European Application No. 15879471.9, Extended European Search Report dated Feb. 13, 2018, 11 pages.
Machine Translation and Abstract of Chinese Publication No. CN103238345, Aug. 7, 2013, 34 pages.
Foreign Communication From a Counterpart Application, PCT Application No. PCT/CN2015/072051, English Translation of International Search Report dated Sep. 24, 2015, 2 pages.
Foreign Communication From a Counterpart Application, PCT Application No. PCT/CN2015/072051, English Translation of Written Opinion dated Sep. 24, 2015, 6 pages.
Machine Translation and Abstract of Korean Publication No. KR20110064407, Jun. 15, 2011, 18 pages.
Foreign Communication From a Counterpart Application, Korean Application No. 9-5-2019-007414811, Korean Notice of Allowance dated Jan. 30, 2019, 3 pages.

* cited by examiner

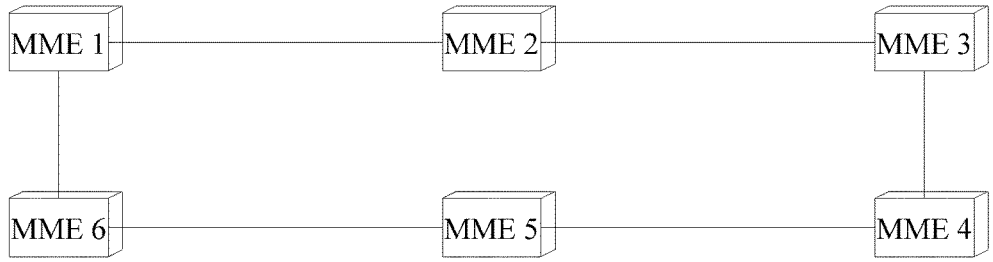

FIG. 3

```
┌─────────────────────────────────────────────────────────────┐
│ A DNS server receives a request message sent by an MME,     │
│ where the request message includes a pool identity of an    │
│ MME pool in which the MME is located, and the request       │
│ message is used to request to acquire MMECs of all          │──401
│ MMEs in the MME pool                                        │
└─────────────────────────────────────────────────────────────┘
                              │
                              ▼
┌─────────────────────────────────────────────────────────────┐
│ The DNS server acquires, according to the pool identity of  │
│ the MME pool, the MMECs of all the MMEs in the MME pool     │
│ corresponding to the pool identity of the MME pool, and     │
│ sends a request response message to the MME, where the      │
│ request response message includes the MMECs of all the      │──402
│ MMEs such that the MME determines a backup MME of the MME   │
│ according to the MMECs of all the MMEs                      │
└─────────────────────────────────────────────────────────────┘
                              │
                              ▼
┌─────────────────────────────────────────────────────────────┐
│ The DNS server receives an interface request message sent   │
│ by the MME, where the interface request message includes    │
│ an MMEC of the backup MME and the pool identity of the MME  │
│ pool, and the interface request message is used to request  │──403
│ to acquire interface information of the backup MME          │
└─────────────────────────────────────────────────────────────┘
                              │
                              ▼
┌─────────────────────────────────────────────────────────────┐
│ The DNS server acquires the interface information of the    │
│ backup MME according to the MMEC of the backup MME and      │
│ the pool identity of the MME pool, and sends an interface   │
│ response message to the MME, where the interface response   │
│ message includes the interface information of the backup    │
│ MME such that the MME sends, according to the interface     │──404
│ information of the backup MME, user information of UE       │
│ attached to the MME to the backup MME                       │
└─────────────────────────────────────────────────────────────┘
```

FIG. 4

SERVICE REDUNDANCY METHOD AND RELATED APPARATUS

CROSS-REFERENCE TO RELATED APPLICATION

This application is a continuation of International Patent Application No. PCT/CN2015/072051 filed on Jan. 30, 2015, which is hereby incorporated by reference in its entirety.

TECHNICAL FIELD

The present disclosure relates to the field of communications technologies, and in particular, to a service redundancy method and a related apparatus.

BACKGROUND

In a Long Term Evolution (LTE) network architecture, multiple mobility management entities (MMEs) in an MME pool simultaneously serve a same wireless area, where each MME in the MME pool is interconnected with all base stations in the MME pool, and the MMEs in the MME pool share resources, and share service load.

When an MME in the MME pool becomes faulty, if user equipment (UE) attached to the faulty MME actively initiates a service request, a base station serving the UE sends, using a preset policy, for example, a load balancing principle, the service request of the UE to another MME that works normally in the MME pool. The MME that works normally rejects the service request of the UE, and the UE needs to re-attach to the MME that works normally in order to implement service recovery, thereby implementing redundancy among MMEs in the MME pool.

However, a redundancy effect of the solution provided in other approaches is relatively poor, for example, when a UE needs to initiate a Voice over LTE (VoLTE) mobile originated service, and an MME to which the UE is attached becomes faulty, a base station that provides a service for the UE sends a VoLTE mobile originated service request message of the UE to a new MME in the MME pool, but the new MME rejects the VoLTE mobile originated service request of the UE. The UE of which the service request is rejected attaches to the new MME by re-initiating an attach procedure, and re-initiates a VoLTE mobile originated service, and then the new MME provides a service for the VoLTE mobile originated service of the UE. This causes that the VoLTE mobile originated service of the UE cannot succeed at a time. In addition, after an MME becomes faulty, service requests initiated by all UEs that are attached to the faulty MME are rejected by a network side, which triggers new attach procedures of these UEs, and attach procedures generated by a large quantity of users in a relatively short time bring great signaling impact on other network elements, such as a home subscriber server (HSS), in an LTE network, causing HSS congestion. The HSS is a critical node in the entire network, and HSS congestion causes a failure in accessing the network by a user, or a sharp decrease in a VoLTE call success rate.

SUMMARY

Embodiments of the present disclosure provide a service redundancy method and a related apparatus, which resolve a problem that a redundancy effect of an existing redundancy solution is relatively poor.

To achieve the foregoing objective, the following technical solutions are adopted in the embodiments of the present disclosure.

According to a first aspect, an embodiment of the present disclosure provides a service redundancy method, where the method includes sending, by an MME, a request message to a domain name system (DNS) server, where the request message includes a pool identity of an MME pool in which the MME is located, and the request message is used to request to acquire MME codes (MMECs) of all MMEs in the MME pool, receiving, by the MME, a request response message sent by the DNS server, where the request response message includes the MMECs of all the MMEs in the MME pool, determining, by the MME, a backup MME of the MME according to the MMECs of all the MMEs in the MME pool and according to a preset policy, sending, by the MME, an interface request message to the DNS server, where the interface request message includes an MMEC of the backup MME and the pool identity of the MME pool, and the interface request message is used to request to acquire interface information of the backup MME, receiving, by the MME, an interface response message sent by the DNS server, where the interface response message includes the interface information of the backup MME, and sending, by the MME according to the interface information of the backup MME, user information of UE attached to the MME to the backup MME.

According to a second aspect, an embodiment of the present disclosure provides a service redundancy method, where the method includes receiving, by a DNS server, a request message sent by an MME, where the request message includes a pool identity of an MME pool in which the MME is located, and the request message is used to request to acquire MMECs of all MMEs in the MME pool, acquiring, by the DNS server according to the pool identity of the MME pool, the MMECs of all the MMEs in the MME pool corresponding to the pool identity of the MME pool, and sending a request response message to the MME, where the request response message includes the MMECs of all the MMEs such that the MME determines a backup MME of the MME according to the MMECs of all the MMEs, receiving, by the DNS server, an interface request message sent by the MME, where the interface request message includes an MMEC of the backup MME and the pool identity of the MME pool, and the interface request message is used to request to acquire interface information of the backup MME, and acquiring, by the DNS server, the interface information of the backup MME according to the MMEC of the backup MME and the pool identity of the MME pool, and sending an interface response message to the MME, where the interface response message includes the interface information of the backup MME such that the MME sends, according to the interface information of the backup MME, user information of UE attached to the MME to the backup MME.

According to a third aspect, an embodiment of the present disclosure provides a service redundancy method, where the method includes receiving, by a serving MME, a service request message sent by the UE using an evolved NodeB (eNodeB) after an MME to which UE is attached becomes faulty, where the service request message includes an identity of the UE and an identity of the MME to which the UE is attached, the service request message is used to request the MME to which the UE is attached to provide a service for the UE, the serving MME is an MME selected, after the MME to which the UE is attached becomes faulty, by the eNodeB to provide a service for the UE, and the MME to which the UE is attached and the serving MME are located in a same MME pool, acquiring, by the serving MME, user information of the UE according to the identity of the UE or according to the identity of the UE and the identity of the MME to which the UE is attached, and providing, by the serving MME according to the user information of the UE, the service corresponding to the service request message for the UE.

According to a fourth aspect, an embodiment of the present disclosure provides a service redundancy method, where the method includes receiving, by a serving MME, a paging request message sent by a network element of a core network in a circuit switched (CS) domain that is in a second-generation mobile communications technology (2G) network or a third-generation mobile communications technology (3G) network after an MME to which UE is attached becomes faulty, where the paging request message includes an identity of the UE, the paging request message is used to request to initiate CSFB paging or 1×CSFB paging on the UE, the serving MME is an MME that provides a service for the UE when the MME to which the UE is attached becomes faulty, and the MME to which the UE is attached and the serving MME are located in a same MME pool, acquiring, by the serving MME, user information of the UE according to the identity of the UE, and acquiring, by the serving MME according to the user information, a tracking area in which the UE is located, and initiating a paging request in the tracking area.

According to a fifth aspect, an embodiment of the present disclosure provides an MME, where the MME includes a sending unit, a receiving unit, and a determining unit, where the sending unit is configured to send a request message to a DNS server, where the request message includes a pool identity of an MME pool in which the MME is located, and the request message is used to request to acquire MMECs of all MMEs in the MME pool. The receiving unit is configured to receive a request response message sent by the DNS server, where the request response message includes the MMECs of all the MMEs in the MME pool. The determining unit is configured to determine a backup MME of the MME according to the MMECs of all the MMEs in the MME pool and according to a preset policy. The sending unit is further configured to send an interface request message to the DNS server, where the interface request message includes an MMEC of the backup MME and the pool identity of the MME pool, and the interface request message is used to request to acquire interface information of the backup MME. The receiving unit is further configured to receive an interface response message sent by the DNS server, where the interface response message includes the interface information of the backup MME, and the sending unit is further configured to send, according to the interface information of the backup MME, user information of UE attached to the MME to the backup MME.

In a first possible implementation manner, with reference to the fifth aspect, the determining unit is further configured to sort the MMECs of all the MMEs in the MME pool according to an ascending order of the MMECs, to obtain a sorting result, and set an MME corresponding to an MMEC that is adjacent to an MMEC of the MME and greater than the MMEC of the MME as the backup MME, and set an MME of which an MMEC is the smallest in the sorting result as the backup MME if the MMEC of the MME is the largest in the sorting result.

In a second possible implementation manner, with reference to the fifth aspect or the first possible implementation manner of the fifth aspect, the sending unit is further configured to send a backup request message to the backup MME using an interface corresponding to the interface information of the backup MME, where the backup request message includes an identity of the UE and the user information of the UE, and the backup request message is used to request the backup MME to back up the user information of the UE.

According to a sixth aspect, an embodiment of the present disclosure provides a DNS server, where the DNS server includes a receiving unit, a first acquiring unit, a sending unit, and a second acquiring unit, where the receiving unit is configured to receive a request message sent by an MME, where the request message includes a pool identity of an MME pool in which the MME is located, and the request message is used to request to acquire MMECs of all MMEs in the MME pool. The first acquiring unit is configured to acquire, according to the pool identity of the MME pool, the MMECs of all the MMEs in the MME pool corresponding to the pool identity of the MME pool. The sending unit is configured to send a request response message to the MME, where the request response message includes the MMECs of all the MMEs such that the MME determines a backup MME of the MME according to the MMECs of all the MMEs. The receiving unit is further configured to receive an interface request message sent by the MME, where the interface request message includes an MMEC of the backup MME and the pool identity of the MME pool, and the interface request message is used to request to acquire interface information of the backup MME. The second acquiring unit is configured to acquire the interface information of the backup MME according to the MMEC of the backup MME and the pool identity of the MME pool, and the sending unit is configured to send an interface response message to the MME, where the interface response message includes the interface information of the backup MME such that the MME sends, according to the interface information of the backup MME, user information of UE attached to the MME to the backup MME.

According to a seventh aspect, an embodiment of the present disclosure provides a serving mobility management entity MME, where the serving MME includes a receiving unit, an acquiring unit, and a serving unit, where the receiving unit is configured to receive a service request message sent by the UE using an eNodeB after an MME to which UE is attached becomes faulty, where the service request message includes an identity of the UE and an identity of the MME to which the UE is attached, the service request message is used to request the MME to which the UE is attached to provide a service for the UE, the serving MME is an MME selected, after the MME to which the UE is attached becomes faulty, by the eNodeB to provide a service for the UE, and the MME to which the UE is attached and the serving MME are located in a same MME pool. The acquiring unit is configured to acquire user information of the UE according to the identity of the UE or according to the identity of the UE and the identity of the MME to which the UE is attached, and the serving unit is configured to provide, according to the user information of the UE, the service corresponding to the service request message for the UE.

In a first possible implementation manner, with reference to the seventh aspect, the receiving unit is further configured to receive the user information of the UE and the identity of the UE that are sent by the MME to which the UE is attached, and record a correspondence between the user information of the UE and the identity of the UE, and the acquiring unit is further configured to acquire, according to the identity of the UE, the user information that is of the UE and saved by the serving MME.

In a second possible implementation manner, with reference to the seventh aspect, the acquiring unit is further configured to acquire, according to the identity of the MME to which the UE is attached, interface information of a backup MME of the MME to which the UE is attached, and acquire, from the backup MME, the user information of the UE according to the identity of the UE and the interface information of the backup MME, where the backup MME and the serving MME are located in a same MME pool.

In a third possible implementation manner, with reference to the second possible implementation manner, the identity of the MME to which the UE is attached is an MMEC of the MME to which the UE is attached, and the acquiring unit is further configured to send a request message to a DNS server, where the request message includes a pool identity of an MME pool in which the serving MME is located, and the request message is used to request to acquire MMECs of all MMEs in the MME pool, receive a request response message sent by the DNS server, where the request response message includes the MMECs of all the MMEs in the MME pool, acquire, according to the MMEC of the MME to which the UE is attached and the MMECs of all the MMEs and according to a preset policy, the backup MME of the MME to which the UE is attached, send an interface request message to the DNS server, where the interface request message includes an MMEC of the backup MME and the pool identity of the MME pool such that the DNS server acquires the interface information of the backup MME according to the pool identity of the MME pool and the MMEC of the backup MME, and receive an interface response message sent by the DNS server, where the interface response message includes the interface information of the backup MME.

In a fourth possible implementation manner, with reference to any one of the seventh aspect to the third possible implementation manner of the seventh aspect, the service request message is a VoLTE mobile originated service request message of the UE, a CS fallback (CSFB) request message of the UE, or a 1×CSFB request message of the UE, and the identity of the MME to which the UE is attached is the MMEC of the MME to which the UE is attached, or the service request message is a tracking area update (TAU) request message of the UE, and the identity of the MME to which the UE is attached is a globally unique temporary identity (GUTI) allocated to the UE by the MME to which the UE is attached, where the GUTI includes the MMEC of the MME to which the UE is attached.

In a fifth possible implementation manner, with reference to any one of the seventh aspect to the fourth possible implementation manner of the seventh aspect, the identity of the UE is a short temporary mobile subscriber identity (S-TMSI) of the UE.

In a sixth possible implementation manner, with reference to any one of the seventh aspect to the fifth possible implementation manner of the seventh aspect, the serving MME further includes a determining unit and a sending unit, where the determining unit is configured to determine, according to the user information of the UE, that the UE is an authorized user, and the sending unit is configured to separately send a modification request message to a serving gateway (SGW) and an HSS that are connected to the MME, where the modification request message includes the identity of the UE, and the modification request message is used to request the SGW or the HSS to modify a correspondence between the UE and the MME to which the UE is attached to a correspondence between the UE and the serving MME, and reallocate a GUTI to the UE, and send the reallocated GUTI to the UE such that the UE is attached to the serving MME.

According to an eighth aspect, an embodiment of the present disclosure provides a serving MME, where the serving MME includes a receiving unit, an acquiring unit, and a paging unit, where the receiving unit is configured to receive a paging request message sent by a network element of a core network in a CS domain that is in a 2G network or a 3G network after an MME to which UE is attached becomes faulty, where the paging request message includes an identity of the UE, the paging request message is used to request to initiate CSFB paging or 1×CSFB paging on the UE, the serving MME is an MME that provides a service for the UE when the MME to which the UE is attached becomes faulty, and the MME to which the UE is attached and the serving MME are located in a same MME pool. The acquiring unit is configured to acquire user information of the UE according to the identity of the UE, and the paging unit is configured to acquire, according to the user information, a tracking area in which the UE is located, and initiate a paging request in the tracking area.

In a first possible implementation manner, with reference to the eighth aspect, the serving MME further includes a recording unit, where the receiving unit is further configured to receive the user information of the UE and the identity of the UE that are sent by the MME to which the UE is attached. The recording unit is configured to record a correspondence between the user information of the UE and the identity of the UE, and the acquiring unit is configured to acquire, according to the identity of the UE, the user information that is of the UE and saved by the serving MME.

In a second possible implementation manner, with reference to the eighth aspect, the serving MME further includes a sending unit, where the sending unit is configured to send a broadcast request message to all MMEs in the MME pool, where the broadcast request message includes the identity of the UE, and the broadcast request message is used to request to acquire the user information of the UE, and the receiving unit is further configured to receive a broadcast response message of a backup MME of the MME to which the UE is attached, where the broadcast response message includes the user information of the UE.

The embodiments of the present disclosure provide a service redundancy method and a related apparatus, where an MME acquires, from a DNS server, MMECs of all MMEs in an MME pool in which the MME is located. The MME acquires, using a preset policy, a backup MME of the MME according to the MMECs of all the MMEs in the MME pool, and acquires interface information of the backup MME from the DNS server. The MME backs up user information of a UE attached to the MME to the backup MME, and when the MME becomes faulty, a network side sends a service request message corresponding to the UE to an MME that works normally in the MME pool, and the MME that works normally is used as a serving MME of the UE, where the serving MME can acquire the user information of the UE from the backup MME in order to provide a service for the UE such that a service of the UE can succeed at a time, which resolves a problem that a service redundancy effect is relatively poor.

BRIEF DESCRIPTION OF DRAWINGS

To describe the technical solutions in the embodiments of the present disclosure more clearly, the following briefly introduces the accompanying drawings required for describing the embodiments or the other approaches. The accompanying drawings in the following description show merely some embodiments of the present disclosure, and a person of ordinary skill in the art may still derive other drawings from these accompanying drawings without creative efforts.

FIG. 3 is a schematic diagram of an MME chain backup relationship;

FIG. 4 is a flowchart 2 of a service redundancy method;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
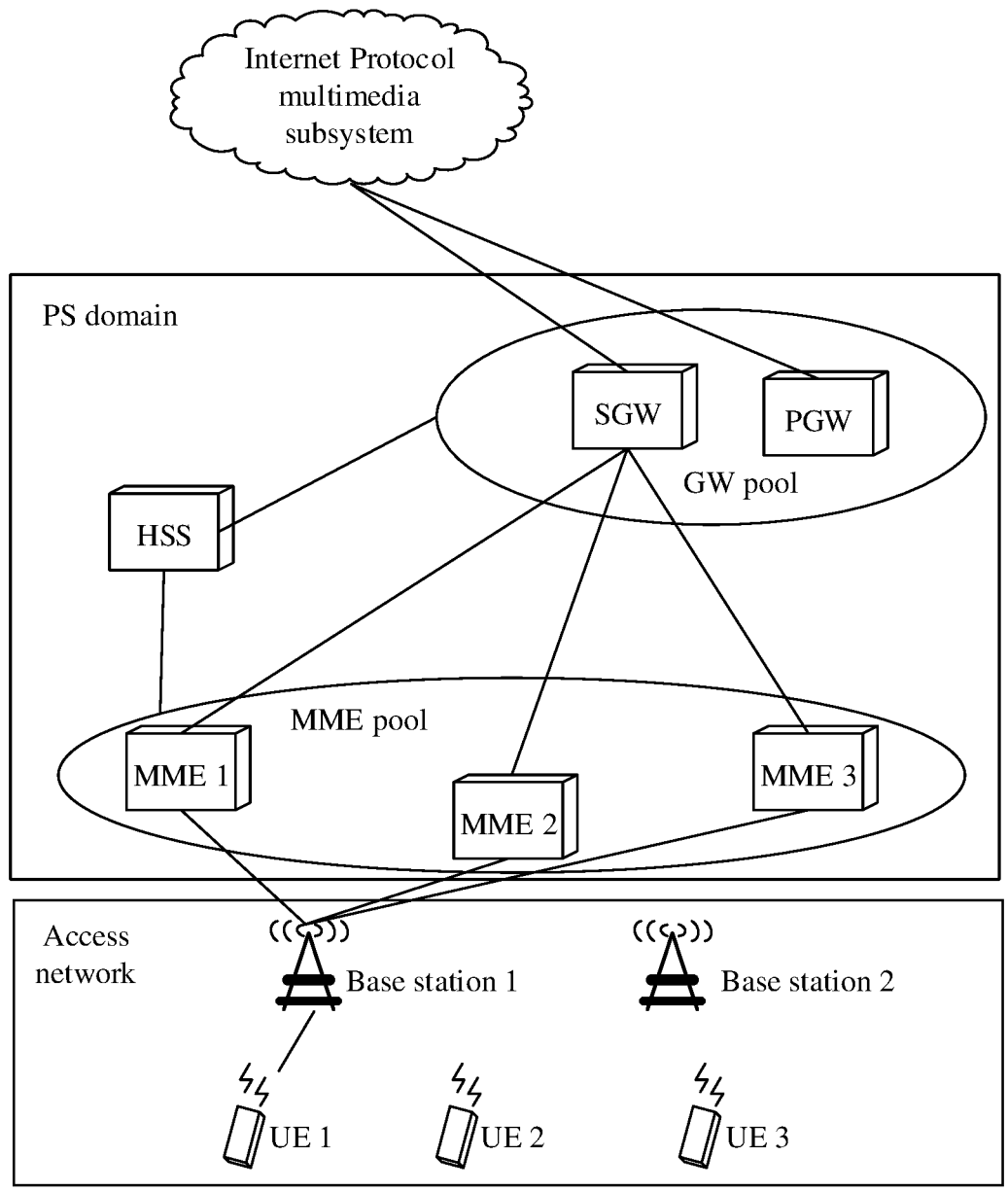
FIG. 1 is a schematic diagram of an LTE network architecture.

With reference to FIG. 1, an LTE network architecture is exemplarily described. In a core network in a packet switching (PS) domain of the architecture, an MME 1, an MME 2, and an MME 3 form an MME pool, and an SGW and a packet data network gateway (PGW) form a GW pool. In addition, the core network in the PS domain of the LTE network further includes an HSS.

In an access network of this architecture, mobile communications devices are connected to base stations in an LTE access network, and the base stations in the access network are connected to MMEs in the MME pool. It should be noted that a connection relationship of only some network elements is exemplarily described in FIG. 1, for example, the HSS actually has a connection relationship with each MME in the MME pool, and any two of the MMEs in the MME pool are connected.

Service redundancy of a UE can be implemented using the MME pool, for example, when the MME 1 to which a UE 1 is attached becomes faulty, a service request actively initiated by the UE 1 is sent, using a base station 1 that provides a service for the UE 1, to an MME that works normally in the MME pool. It is assumed that the MME that works normally is the MME 2, the MME 2 rejects a service request of the UE 1 because the MME 2 does not have user information of the UE 1, and the UE 1 re-initiates an attach procedure and attaches to the MME 2 such that a service of the UE 1 is recovered, thereby implementing MME redundancy in the MME pool.

However, a redundancy effect in the other approaches is relatively poor, for example, when the UE 1 initiates a VoLTE mobile originated service, the MME 1 becomes faulty, and then the base station 1 selects the MME 2 to provide a service for the UE 1. In this case, the MME 2 does not have user information of the UE 1, and the MME 2 cannot provide a service for a user. Therefore, the MME 2 rejects a VoLTE mobile originated service request of the UE 1, and only after the UE 1 attaches to the MME 2, the MME 2 can provide a service for the UE 1. Hence, this causes that a VoLTE service of a UE cannot succeed at a time, causing relatively poor user experience, and, after the MME 1 becomes faulty, service requests initiated by all UEs attached to the MME 1 are rejected by a network side, thereby triggering new attach procedures of these UEs, and attach procedures of a large quantity of users in a relatively short time bring great signaling impact on other related network elements in the network, such as the HSS, causing congestion of the HSS, which causes adverse impact that a user cannot access the network, or a VoLTE call success rate sharply decreases.

Further, user information of a UE may include subscription data information of the UE, information corresponding to a service of the UE, and the like. When a VoLTE mobile originated and terminated service of the UE, a CSFB mobile originated and terminated service of the UE, and a TAU update service of the UE exist, an MME may acquire, from the user information of the UE, information required for processing these services.

Figure 2:
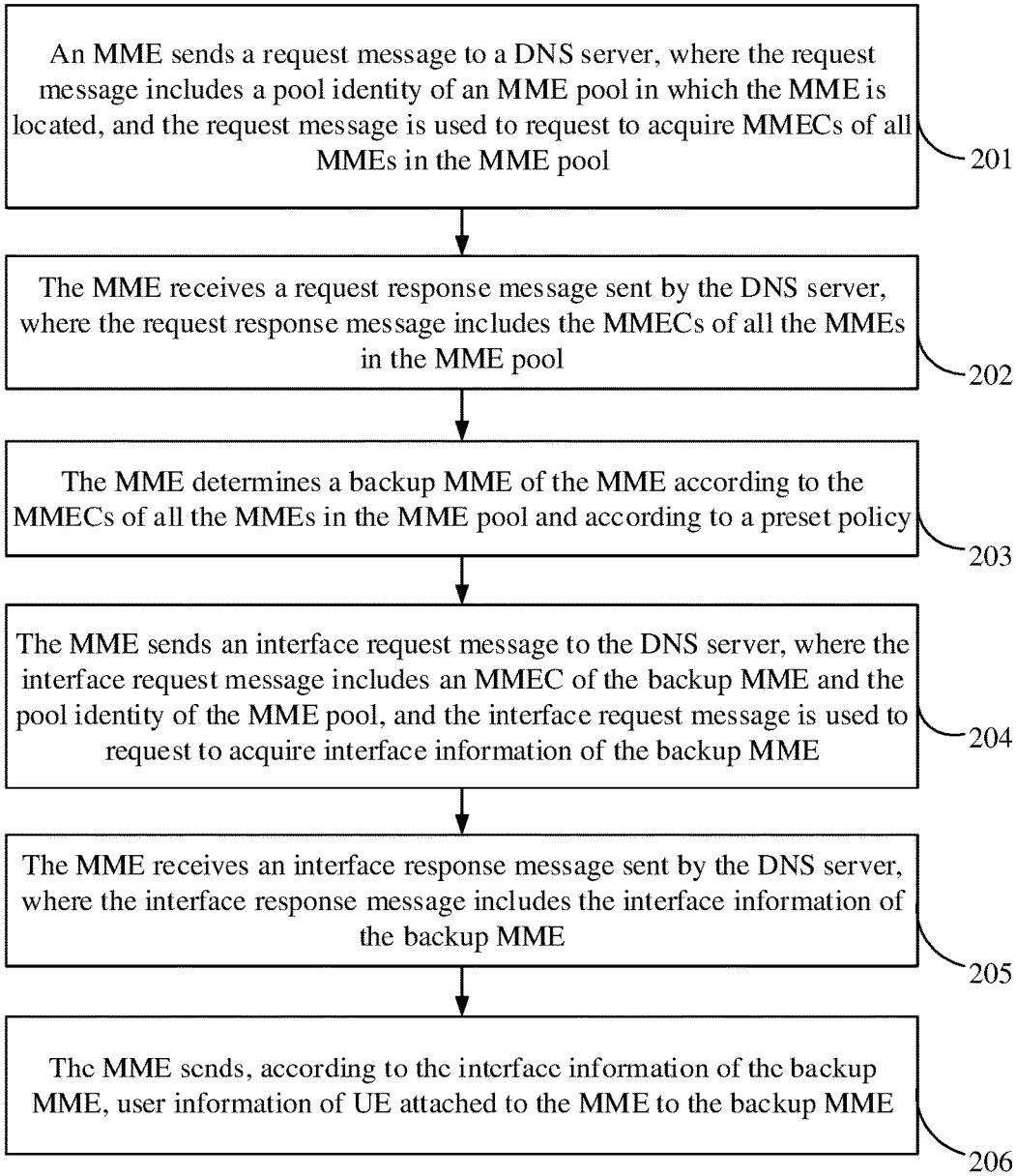
FIG. 2 is a flowchart 1 of a service redundancy method.

To resolve a problem that a redundancy effect is relatively poor, an embodiment of the present disclosure provides a service redundancy method, and with reference to FIG. 2, the method includes the following steps.

Step 201: An MME sends a request message to a DNS server, where the request message includes a pool identity of an MME pool in which the MME is located, and the request message is used to request to acquire MMECs of all MMEs in the MME pool.

With reference to FIG. 1, the MME 1, the MME 2, and the MME 3 form an MME pool, where the MME pool is an MME pool in an LTE network shown in FIG. 1. Further, the LTE network shown in FIG. 1 may also have another MME pool that is not shown.

Each MME pool in the LTE network has a uniquely corresponding MME group identifier (MMEGI), and a code of each MMEC in the pool is a unique identity of the MME in the MME pool.

Based on this, one backup MME may be configured for each MME using a preset policy, for example, MMECs of all MMEs and information about available interfaces of all the MMEs are pre-configured in the DNS server, MMEC information of all the MMEs and the information about available interfaces of all the MMEs in the pool are acquired from the DNS server by an MME in the pool, and a backup MME of the MME is parsed using the preset policy.

Further, an MMEGI of each MME pool and MMECs of MMEs in the MME pool are stored in the DNS server. The DNS server divides all MMEs in the MME pool into at least one group, and allocates, to each group, identity information (LIST_ID) that uniquely identifies the group.

For example, an MMEGI of an MME pool is MMEGI-1, and the MME pool has 10 MMEs, which are respectively MME 1-MME 10. It is assumed that MMECs of the 10 MMEs are respectively 1-10, and data information related to the MME pool is pre-stored in the DNS server, for example, MMEGI information of the MME pool. The 10 MMEs are divided into two groups in advance, LIST_ID corresponding to the first group is LIST_ID-1, and the first group includes six MMEs of MME 1-MME 6, LIST_ID corresponding to the second group is LIST_ID-2, and the second group includes four MMEs of MME 7-MME 10.

Further, the MME may send the request message to the DNS server using a first fully qualified domain name (FQDN), where the first FQDN may be:

ring.mmegi<MMEGI>.mme.epc.mnc<MNC>.mcc<MCC>0.3gppnetwork.org.

MMEGI is pool identity information of the MME pool in which the MME is located, and it is assumed that the MMEGI is MMEGI-1. MNC is mobile network code and is used to distinguish information about an operator to which a network belongs, where the MNC includes two decimal numbers, and a code range is decimal 00-99. For example, an MNC of CHINA MOBILE is 00, 02, 04, and 06, an MNC of CHINA UNICOM is 01, 05, and 07, and an MNC of CHINA TELECOM is 03. MCC is a mobile country code, and is used to uniquely identify a country to which a mobile subscriber belongs.

The DNS server queries, according to MMEGI-1, information about LIST_ID-1 and LIST_ID-2 that are in the foregoing MME pool, and MMEC information of all MMEs in LIST_ID-1 and LIST_ID-2.

Step 202: The MME receives a request response message sent by the DNS server, where the request response message includes the MMECs of all the MMEs in the MME pool.

Further, the request response message sent by the DNS server may be in a form shown in the following second FQDN:
<interface-name>.ring.mmec<MMEC>.list<LIST_ID>.mmegi<MMEGI>.mme.epc.mnc<MNC>.mcc<MCC>0.3gppnetwork.org.

For example, if the pool in which the MME is located has 10 MMEs, the DNS server sends 10 messages shown in the foregoing second FQDN to the MME. For example, if MMEC represents an MME 1, prefix <interface-name> carries information about an available interface of the MME 1, <LIST_ID> represents identity information LIST_ID-1 of a group in which the MME 1 is located, and MMEGI is identity information MMEGI-1 of an MME pool in which the MME 1 is located.

The MME may acquire, according to information in the second FQDN, MMEC information of all the MMEs in the MME pool and LIST_ID information corresponding to each MME, that is, the MME pool includes 10 MMEs, the 10 MMEs are divided into two groups, and identity information of the two groups is respectively LIST_ID-1 and LIST_ID-2. A group corresponding to LIST_ID-1 includes six MMEs of MME 1-MME 6, and MMEC information of the six MMEs, a group corresponding to LIST_ID-2 includes four MMEs of MME 7-MME 10, and MMEC information of the four MMEs.

Step 203: The MME determines a backup MME of the MME according to the MMECs of all the MMEs in the MME pool and according to a preset policy.

Further, the MME sorts the MMECs of all the MMEs in the MME pool according to an ascending order of the MMECs, to obtain a sorting result.

The MME uses an MME corresponding to an MMEC that is adjacent to an MMEC of the MME and greater than the MMEC of the MME as the backup MME, and if the MMEC of the MME is the largest in the sorting result, the MME uses an MME of which an MMEC is the smallest in the sorting result as the backup MME.

For example, after acquiring the MMECs of all the MMEs, the MME sorts MMECs of MMEs in a same group according to an ascending order in order to generate a chain backup loop shown in FIG. 3.

Further, with reference to FIG. 3, an MME chain backup loop is exemplarily described. It is assumed that the MME is an MME 1, an identity of a group in which the MME 1 is located is LIST_ID-1, and six MMEs in the group are respectively MME 1-MME 6. It is assumed that MMECs of MME 1-MME 6 successively increase in ascending order, and the six MMEs can form a chain backup relationship shown in FIG. 3. In the chain backup loop, an MME of which an MMEC number is relatively small selects an MME of which an MMEC number is relatively large and adjacent to the MME in value sorting as a backup MME, and an MME of which an MMEC number is the largest selects an MME of which an MMEC number is the smallest in the chain backup loop as a backup MME.

For example, a backup MME of the MME 1 is an MME 2, a backup MME of the MME 2 is an MME 3, . . . , a backup MME of an MME 5 is the MME 6, and a backup MME of the MME 6 is the MME 1.

Certainly, the MME may also acquire, according to a same method, a chain backup loop of a group corresponding to LIST_ID-2 in order to obtain backup relationships of all the MMEs in the MME pool.

It should be noted that the chain backup relationship shown in FIG. 3 is only a feasible implementation manner. The MME may further generate a backup relationship of MMEs in a pool in another form according to a preset policy, which is not limited in this embodiment of the present disclosure. In addition, any method, based on the idea of the present disclosure, for acquiring a backup MME of an MME in a same pool is within the protection scope of the present disclosure.

Step 204: The MME sends an interface request message to the DNS server, where the interface request message includes an MMEC of the backup MME and the pool identity of the MME pool, and the interface request message is used to request to acquire interface information of the backup MME.

Further, <interface-name> in the second FQDN carries information about only one interface of an MME. However, actually, an MME in the pool includes multiple interfaces. When an MME in the pool wants to communicate with another MME, communication may not be performed according to only one interface of the MME, and information about another available interface of the MME needs to be acquired.

In a scenario shown in this embodiment of the present disclosure, the MME needs to back up user information of a UE to the backup MME. Therefore, the MME needs to acquire information about all interfaces of the backup MME.

In this case, the MME may send the following third FQDN to the DNS server:
mmec<MMEC>.list<LIST_ID>.mmegi<MMEGI>.mme.epc.mnc<MNC>.mcc<MCC>0.3gppnetwork.org.

MMEC in the third FQDN is the MMEC of the backup MME, and is used to identify the information that is about all the interfaces of the backup MME and the MME requests to acquire. The DNS server performs querying and parsing, using information in the third FQDN, to acquire the information about all the interfaces of the backup MME, and sends address information of all the interfaces of the backup MME to the MME.

Step 205: The MME receives an interface response message sent by the DNS server, where the interface response message includes the interface information of the backup MME.

The interface response message is a fourth FQDN:
<interface-name>.ring.mmec<MMEC>.list<LIST_ID>.mmegi<MMEGI>.mme.epc.mnc<MNC>.mcc<MCC>0.3gppnetwork.org, where MMEC in the fourth FQDN is the MMEC of the backup MME, and interface-name includes the information about all the interfaces of the backup MME, or if the backup MME has F interfaces, the interface response message includes F fourth FQDNs, and interface-name of each fourth FQDN includes information about one interface of the backup MME, where any two pieces of information that is about an interface of the backup MME and included in the F fourth FQDNs are different.

It should be noted that when MMEs increase or decrease in the pool, for example, with reference to FIG. 3, when the MME 6 stops being used, using technical solutions in this embodiment of the present disclosure, an MME in the pool only needs to re-acquire MMECs of all MMEs in the pool and information about an available interface of each MME by performing step 201 to step 205, and parse information about a backup MME of the MME using a preset policy. For example, when the MME 6 stops being used, a backup MME of the MME 1 changes to the MME 5, which not only ensures that each MME in the MME pool has a backup MME, but also reduces complexity of acquiring, by each MME, backup relationships of all the MMEs in the pool and information about interfaces of all the MMEs.

Step 206: The MME sends, according to the interface information of the backup MME, user information of UE attached to the MME to the backup MME.

Further, the MME sends a backup request message to the backup MME using an interface of the backup MME, where the backup request message carries identity information of the UE and the user information of the UE, and the backup request message is used to request the backup MME to back up the user information of the UE.

After receiving the backup request message, the backup MME stores the user information of the UE, and records a correspondence between the identity information of the UE and the user information of the UE.

This embodiment of the present disclosure provides a service redundancy method. In this method, MMEC information of all MMEs in a pool and information about available interfaces of all the MMEs are pre-configured in a DNS server. When the MME needs to back up user information of a UE attached to the MME, the MME queries, from the DNS server using an FQDN, MMEC information of all MMEs in a pool in which the MME is located, acquires information about a backup MME of the MME according to a preset policy, queries information about an available interface of the backup MME from the DNS server, and backs up the user information of the UE to the backup MME using the available interface of the backup MME such that when the MME becomes faulty, another MME in the MME pool acquires the user information of the UE from the backup MME in order to provide a service for the UE. Therefore, a service of the UE can succeed at a time, which resolves a problem in the other approaches that a service redundancy effect is relatively poor.

Further, with reference to FIG. 4, an embodiment of the present disclosure further provides a service redundancy method, where the method includes the following steps.

Step 401: A DNS server receives a request message sent by an MME, where the request message includes a pool identity of an MME pool in which the MME is located, and the request message is used to request to acquire MMECs of all MMEs in the MME pool.

Step 402: The DNS server acquires, according to the pool identity of the MME pool, the MMECs of all the MMEs in the MME pool corresponding to the pool identity of the MME pool, and sends a request response message to the MME, where the request response message includes the MMECs of all the MMEs such that the MME determines a backup MME of the MME according to the MMECs of all the MMEs.

Step 403: The DNS server receives an interface request message sent by the MME, where the interface request message includes an MMEC of the backup MME and the pool identity of the MME pool, and the interface request message is used to request to acquire interface information of the backup MME.

Step 404: The DNS server acquires the interface information of the backup MME according to the MMEC of the backup MME and the pool identity of the MME pool, and sends an interface response message to the MME, where the interface response message includes the interface information of the backup MME such that the MME sends, according to the interface information of the backup MME, user information of UE attached to the MME to the backup MME.

Further, for detailed technical features in this embodiment of the present disclosure, reference may be made to the foregoing embodiment corresponding to FIG. 2, and details are not described again in this embodiment of the present disclosure.

This embodiment of the present disclosure provides a service redundancy method. In this method, MMEC information of all MMEs in an MME pool and information about available interfaces of all the MMEs are pre-configured in a DNS server. When an MME in the MME pool needs to back up user information of a UE attached to the MME, the MME queries, from the DNS server using an FQDN, the MMEC information of all the MMEs in the MME pool in which the MME is located, and acquires information about a backup MME of the MME according to the MMEC information of all the MMEs using a preset policy, and queries information about an available interface of the backup MME from the DNS server, and backs up the user information of the UE to the backup MME using the available interface of the backup MME such that when the MME becomes faulty, another MME in the MME pool acquires the user information of the UE from the backup MME in order to provide a service for the UE. Therefore, a service of the UE can succeed at a time, which resolves a problem in the other approaches that a service redundancy effect is relatively poor.

Figure 5:
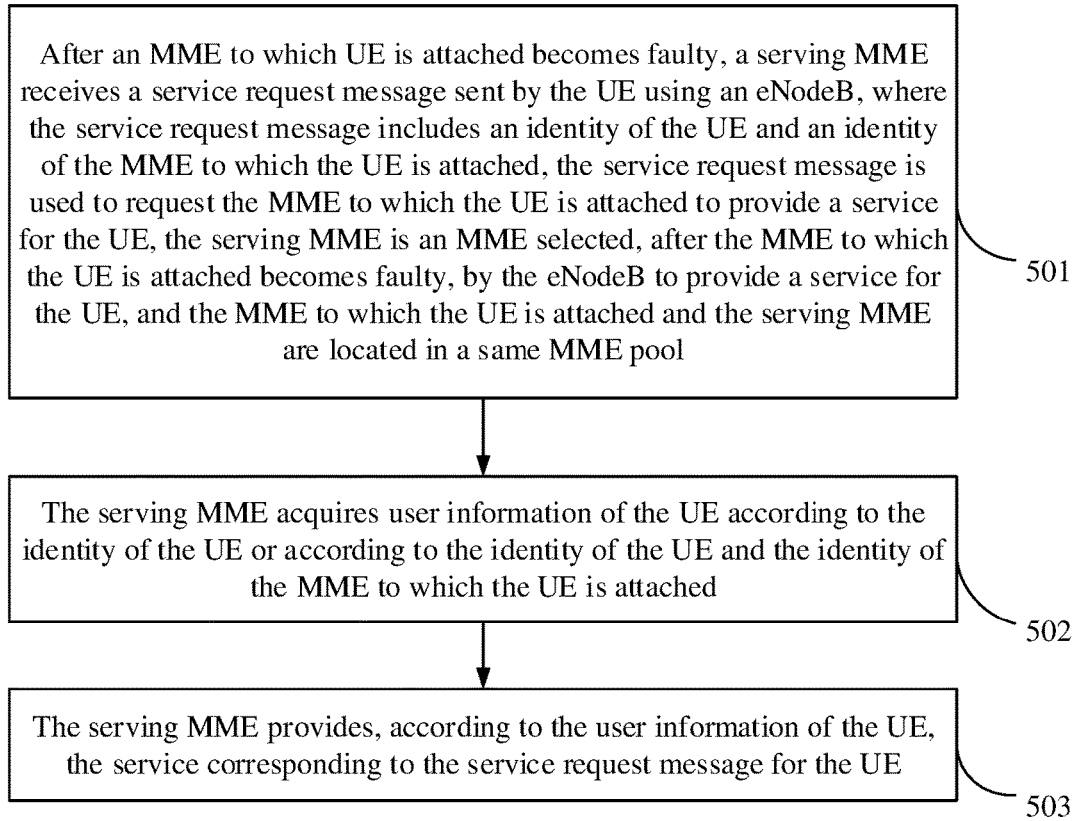
FIG. 5 is a flowchart 3 of a service redundancy method.

To resolve a problem in the other approaches that a service redundancy effect is relatively poor, with reference to FIG. 5, an embodiment of the present disclosure further provides a service redundancy method, where the method includes the following steps.

Step 501: After an MME to which UE is attached becomes faulty, a serving MME receives a service request message sent by the UE using an eNodeB, where the service request message includes an identity of the UE and an identity of the MME to which the UE is attached, the service request message is used to request the MME to which the UE is attached to provide a service for the UE, the serving MME is an MME selected, after the MME to which the UE is attached becomes faulty, by the eNodeB to provide a service for the UE, and the MME to which the UE is attached and the serving MME are located in a same MME pool.

Further, when the UE needs to perform a VoLTE mobile originated service, or a data service, or a CSFB mobile originated service that falls back to a Wideband Code Division Multiple Access (WCDMA) network, or a 1×CSFB mobile originated service that falls back to a CDMA2000 network, or a TAU service, the UE needs to first send a service request message to a base station connected to the UE. Further, the service request varies with a service that the UE needs to initiate. For example, the VoLTE mobile originated service corresponds to a VoLTE mobile originated service request, and the CSFB mobile originated service corresponds to a CSFB mobile originated service request.

The service request message carries identity information of the UE, where the identity information of the UE is information that can uniquely identify the user in a network in which the UE is located, for example, an S-TMSI of the user.

With reference to FIG. 1, it is assumed that the UE is the UE 1 in FIG. 1, and the UE is originally attached to the MME 1 in FIG. 1. After the MME 1 becomes faulty, a base station 1 that serves the UE 1 determines that the MME 1 becomes faulty and cannot continue to provide a service for the UE 1. The base station 1 reselects an MME, for example, the MME 2 in FIG. 1 to provide a service for the UE 1, in an MME pool same as that of the MME 1 for the UE 1 according to a preset policy, for example, a load balancing principle. The MME 2 may be referred to as a serving MME of the UE 1, and a service request message of the UE 1 is sent to the MME 2 in order to instruct the MME 2 to provide a service for the UE 1.

Step 502: The serving MME acquires user information of the UE according to the identity of the UE or according to the identity of the UE and the identity of the MME to which the UE is attached.

After receiving the service request message of the UE 1 that is sent by the base station 1, the serving MME of the UE 1, that is, the MME 2, determines, according to an S-TMSI that is of the UE 1 and carried in the service request message, whether user information of the UE 1 is stored.

Further, with reference to embodiments corresponding to FIG. 2 and FIG. 4, if the MME 2 is a backup MME of the MME 1, the MME 1 backs up the user information of the UE 1 to the MME 2 before the MME 1 becomes faulty, where the MME 2 records a correspondence between an identity of the UE 1 and the user information of the UE 1, and the MME 2 can directly acquire, according to the identity of the UE 1, the user information of the UE 1 from storage space that stores the user information.

If the MME 2 is not the backup MME of the MME 1, and it is assumed that the MME 3 in FIG. 1 is the backup MME of the MME 1, the MME 2 does not store the user information of the UE 1, and cannot acquire the user information of the UE 1 according to identity information of the UE 1. In this case, the MME 2 acquires the user information of the UE 1 from the backup MME of the MME 1, that is, from the MME 3.

Further, the serving MME acquires the user information of the UE through the following process. The serving MME sends a request message to a DNS server, where the request message carries a pool identity of an MME pool in which the serving MME is located, and the request message is used to request to acquire MMECs of all MMEs in the MME pool. The serving MME receives a request response message sent by the DNS server, where the request response message includes the MMECs of all the MMEs in the MME pool. The serving MME acquires, according to an MMEC of the MME to which the UE is attached and the MMECs of all the MMEs, a backup MME of the MME to which the UE is attached, and sends an interface request message to the DNS server, where the interface request message includes an identity of the backup MME and the pool identity of the MME pool such that the DNS server acquires interface information of the backup MME according to the pool identity and the identity of the backup MME, and the serving MME receives an interface response message sent by the DNS server, where the interface response message includes the interface information of the backup MME.

It should be noted that using the method in the embodiment corresponding to FIG. 3, before receiving the service request message, the serving MME may acquire, using the first FQDN, the MMECs of all the MMEs in the MME pool and information about LIST_ID corresponding to each MME, obtain by means of parsing backup relationships of all the MMEs in the MME pool shown in FIG. 4, and query, using the third FQDN, information about all available interfaces of all the MMEs in the MME pool. After receiving the service request message of the UE, the serving MME may directly acquire, from the backup relationships of all the MMEs using MMEC information of the MME to which the UE is attached, the backup MME of the MME to which the UE is attached and information about an available interface of the backup MME, and acquire the user information of the UE using the available interface of the backup MME, without a need to query, each time after receiving a service request message, the foregoing message from the DNS server, thereby reducing a signaling overhead.

The serving MME sends a user information request message to the backup MME using an interface of the backup MME, where the user information request message includes the identity information of the UE. The backup MME acquires the user information of the UE according to the identity information of the UE, and sends the user information of the UE to the serving MME.

It should be noted that a process in which the serving MME acquires the backup MME of the MME to which the UE is attached and the interface of the backup MME is similar to a process in which the MME to which the UE is attached acquires the backup MME and the interface of the backup MME. For detailed technical features, reference may be made to the foregoing embodiment corresponding to FIG. 3, and details are not described again in this embodiment of the present disclosure.

It should be noted that if the service request message is a VoLTE mobile originated service request message of the UE, or the service request message is a CSFB request message or 1×CSFB request message of the UE, the identity information of the MME to which the UE is attached is the MMEC information of the MME to which the UE is attached, and the identity information of the UE is S-TMSI information of the UE, or if the service request message is a TAU request message of the UE, the identity information of the MME to which the UE is attached is GUTI information allocated to the UE by the MME to which the UE is attached, where the GUTI information includes the MMEC information of the MME to which the UE is attached, and the identity information of the UE is S-TMSI information of the UE.

It should be noted that the identity, of the MME to which the UE is attached, that is included in a query request message identifies that the UE requests the MME to which the UE is attached to provide a service for the UE. In the other approaches, after the MME to which the UE is attached becomes faulty, an eNodeB that provides a service for the UE sends the service request message of the UE to another MME in the MME pool, where the other MME may be referred to as a serving MME. The serving MME rejects the service request of the UE because of lack of the user information of the UE. In this case, the UE attaches to the serving MME through a new attach procedure, and the UE re-initiates a service request. In this case, a service request message initiated by the UE includes an identity of the serving MME, which indicates that the UE requests the serving MME to provide a service for the UE.

Step 503: The serving MME provides, according to the user information of the UE, the service corresponding to the service request message for the UE.

Further, after the serving MME acquires the user information of the UE, the serving MME further needs to determine, according to the user information of the UE, whether the UE is an authorized UE. If the UE is not an authorized UE, the serving MME directly rejects the service request of the UE, and if the UE is an authorized UE, the serving MME further needs to send a modification request message to an SGW and an HSS that are connected to the serving MME, where the modification request message carries the identity information of the UE, and the modification request message is used to request the SGW and the HSS to modify a correspondence between the UE and the MME to which the UE is attached to a correspondence between the UE and the serving MME. In addition, the serving MME further needs to reallocate a GUTI to the UE such that the UE attaches to the serving MME, and all services of the UE are completed by the serving MME afterward.

It should be noted that the serving MME delays preset time and sends the modification request message to the HSS. A reason for doing this is that there are tens of thousands of users attached to the MME to which the UE is attached, and after the MME to which the UE is attached becomes faulty, UEs attached to the original MME need an MME that works normally in the MME pool to provide a service for the UEs. In this case, if each serving MME sends a modification request message to the HSS, the HSS receives a large quantity of modification request messages in a short time, causing relatively heavy load of the HSS, which may cause a congestion phenomenon. In addition, because the HSS is an important network element in an LTE core network, congestion of the HSS greatly affects processing of a network service. Therefore, the serving MME delays the preset time and sends the modification request message to the HSS in order to avoid that load of the HSS suddenly increases in a short time.

For example, when there are ten thousand users attached to the MME to which the UE is attached, and the MME to which the UE is attached becomes faulty, the HSS may need to receive ten thousand modification request messages, which causes that load of the HSS suddenly increases, causing congestion. However, if the serving MME delays sending the modification requests, sends 100 modification requests per second, and sends the modification requests to the HSS in 100 seconds, load of the HSS in unit time can be reduced, and impact on the HSS is reduced.

The HSS further bears a large quantity of other services, for example, when the UE is used as a VoLTE called party, the HSS further needs to complete a domain selection procedure in order to determine information about a domain in which the UE is currently located, and if the HSS is congested, a VoLTE terminated call service of the UE fails.

In addition, if the HSS needs to perform a VoLTE terminated call service of the UE before receiving the modification request of the serving MME, the HSS selects, from the pool, any MME that works normally to obtain information that is about the UE and required in the foregoing domain selection procedure, which does not fail the mobile terminated call service of the UE.

Further, in this embodiment of the present disclosure, if the UE has registered with a mobile switching center (MSC) network element of a core network in a CS domain in a 2G/3G network, the serving MME further needs to send a location update request message to the MSC, and the location update request message is used to update information about an MME that has registered with the MSC. If the UE has registered with a 1×CS IWS network element of a core network in a CDMA2000 network, the serving MME further needs to send an MME change notification message to the 1×CS IWS, and the MME change notification message is used to update information about an MME that has registered with the 1×CS IWS.

In this embodiment of the present disclosure, the serving MME further needs to send an indication massage to a base station that provides a service for the UE in order to instruct the base station to establish a link and a bearer on a wireless side, and send a request message to the SGW in order to request to establish a tunnel between the serving MME and an SGW interface.

Further, if the MSC network element in the core network in the CS domain in the 2G/3G network reallocates a TMSI to the UE, the serving MME further needs to instruct the UE to re-establish a correspondence between an international mobile subscriber identity (IMSI) and a TMSI.

In this embodiment of the present disclosure, when the UE needs to perform a CSFB mobile originated service that falls back to a WCDMA network, or a 1×CSFB mobile originated service that falls back to a CDMA2000 network, the serving MME instructs the base station to enable the UE to fall back to the CS domain.

This embodiment of the present disclosure provides a service redundancy method. In this method, after an MME to which a UE is attached becomes faulty, and a base station that provides a service for the UE detects the fault, the base station sends a service request message of the UE to another normal MME in a pool in which the MME to which the UE is attached is located, where the other normal MME is used as a serving MME of the UE. When the serving MME is a backup MME of the MME to which the UE is attached, the serving MME acquires, according to identity information of the UE, user information of the UE from storage space of the serving MME. If the serving MME is not the backup MME of the MME to which the UE is attached, the serving MME acquires information about the backup MME of the MME to which the UE is attached, and requests the user information of the UE from the backup MME, where the serving MME provides a service for the UE according to the user information of the UE such that a service of the UE can succeed at a time, and an effect of avoiding HSS congestion is reached by delaying sending a registration request to an HSS, which resolves a problem that a service redundancy effect is relatively poor.

Figure 6:
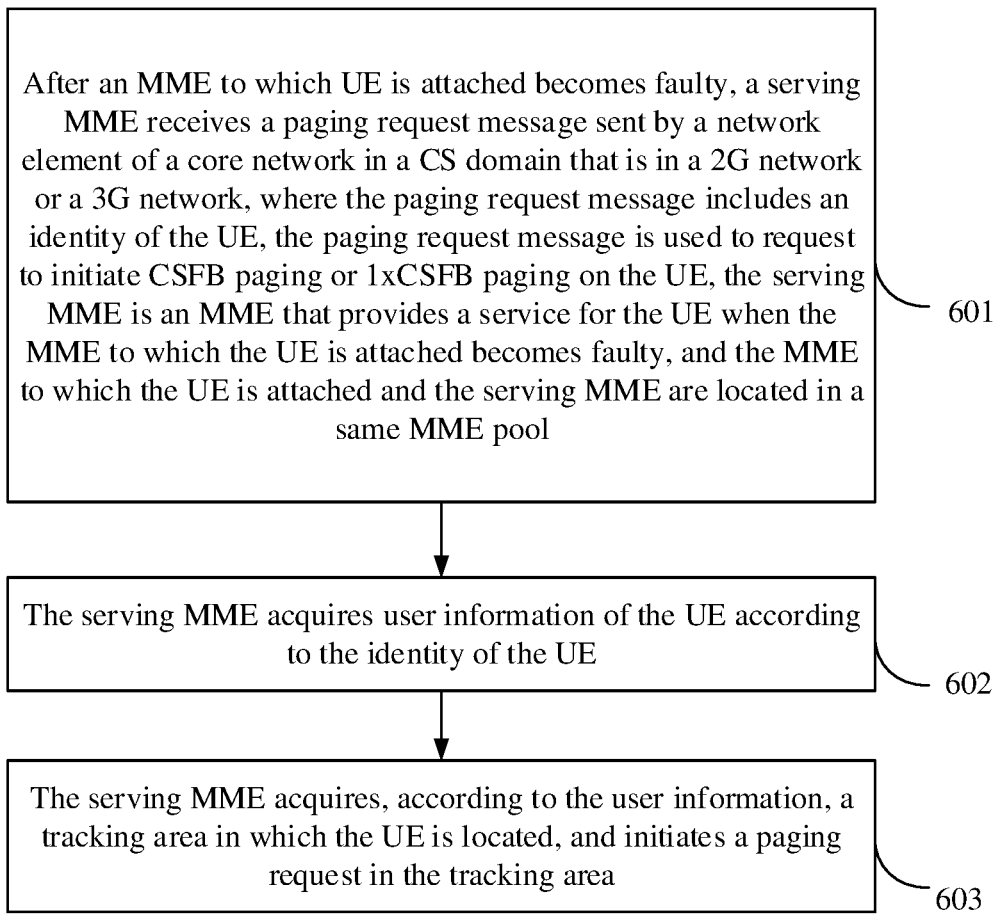
FIG. 6 is a flowchart 4 of a service redundancy method.

To resolve a problem that a service redundancy effect is relatively poor, with reference to FIG. 6, an embodiment of the present disclosure further provides a service redundancy method, where the method includes the following steps.

Step 601: After an MME to which UE is attached becomes faulty, a serving MME receives a paging request message sent by a network element of a core network in a CS domain that is in a 2G network or a 3G network, where the paging request message includes an identity of the UE, and the paging request message is used to request to initiate CSFB paging or 1×CSFB paging on the UE, and the serving MME is an MME that provides a service for the UE when the MME to which the UE is attached becomes faulty, and the MME to which the UE is attached and the serving MME are located in a same MME pool.

When the UE is used as a called user of CSFB/1×CSFB, a network element in a CS domain in a 2G/3G network to which the UE falls back sends a paging request message to the MME to which the UE is attached such that the MME to which the UE is attached pages the UE.

After the MME to which the UE is attached becomes faulty, the network element in the CS domain in the 2G/3G network sends the paging request message to a normal MME in a pool in which the MME to which the UE is attached is located, and the normal MME is used as a serving MME that processes the paging request message.

It should be noted that both CSFB and 1×CSFB are CSFB, but respectively corresponding networks to which a UE falls back are different, for CSFB, a UE falls back to a WCDMA network, and for 1×CSFB, a UE falls back to a CDMA2000 network.

Step 602: The serving MME acquires user information of the UE according to the identity of the UE.

Further, if the serving MME is a backup MME of the MME to which the UE is attached, before the MME to which the UE is attached becomes faulty, the serving MME further receives the user information of the UE and the identity of the UE that are sent by the MME to which the UE is attached, and records a correspondence between the user information of the UE and the identity of the UE. In this case, the serving MME can acquire, according to the identity of the UE, the user information that is of the UE and saved by the serving MME.

If the serving MME is not the backup MME of the MME to which the UE is attached, the serving MME sends a broadcast request message to all MMEs in the MME pool, where the broadcast request message includes the identity of the UE, and the broadcast request message is used to request to acquire the user information of the UE. After receiving the broadcast request message, the backup MME of the MME to which the UE is attached sends a broadcast response message to the serving MME, where the broadcast response message includes the user information of the UE.

Step 603: The serving MME acquires, according to the user information, a tracking area in which the UE is located, and initiates a paging request in the tracking area.

It should be noted that in the other approaches, after the MME to which the UE is attached becomes faulty, a network element in a 2G/3G core network to which the UE falls back also selects, using a preset policy, another MME in the MME pool as a serving MME of the UE to initiate a paging request, but the serving MME does not have the user information of the UE. Therefore, the serving MME cannot acquire the tracking area in which the UE is located, the serving MME can only page the UE in multiple tracking areas, and a paging efficiency is relatively low.

However, in the present disclosure, the serving MME acquires information about the tracking area of the UE according to the user information of the UE, and initiates a paging procedure in the tracking area of the UE, which greatly improves the paging efficiency.

Further, for detailed technical features in the present disclosure, reference may be made to the technical features in the foregoing embodiment corresponding to FIG. 5, and details are not described again in this embodiment of the present disclosure.

This embodiment of the present disclosure provides a service redundancy method. In this method, after a UE is used as a called user of CSFB/1×CSFB, and an MME to which the UE is attached becomes faulty, a network element in a CS domain in a 2G/3G network to which the UE falls back sends a paging request message to another MME that works normally in a MME pool, where the MME that works normally is used as a serving MME to process the paging request message. The serving MME acquires user information of the UE from the serving MME itself or from a backup MME of the MME to which the UE is attached, acquires information about a tracking area of the UE from the user information of the UE, and initiates a paging procedure in the tracking area such that a CSFB/1×CSFB mobile terminated call service of the UE succeeds at a time, which resolves a problem in the other approaches that a service redundancy effect is relatively poor.

Figure 7:
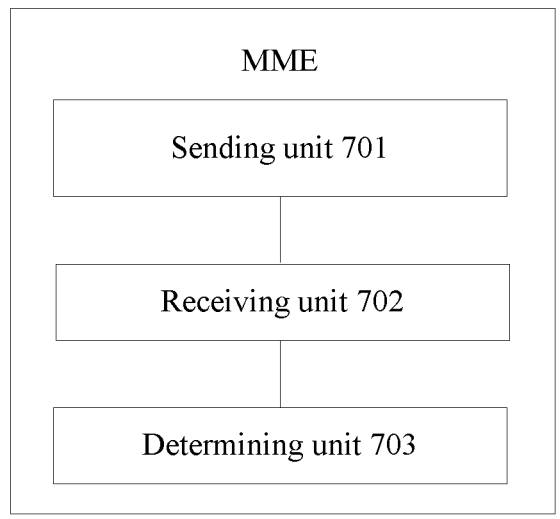
FIG. 7 is a schematic diagram of an MME.

To resolve a problem that a service redundancy effect is relatively poor, with reference to FIG. 7, an embodiment of the present disclosure further provides an MME, where the MME includes a sending unit 701, a receiving unit 702, and a determining unit 703, where the sending unit 701 is configured to send a request message to a DNS server, where the request message includes a pool identity of an MME pool in which the MME is located, and the request message is used to request to acquire MMECs of all MMEs in the MME pool, the receiving unit 702 is configured to receive a request response message sent by the DNS server, where the request response message includes the MMECs of all the MMEs in the MME pool, and the determining unit 703 is configured to determine a backup MME of the MME according to the MMECs of all the MMEs in the MME pool and according to a preset policy.

The sending unit 701 is further configured to send an interface request message to the DNS server, where the interface request message includes an MMEC of the backup MME and the pool identity of the MME pool, and the interface request message is used to request to acquire interface information of the backup MME, the receiving unit 702 is further configured to receive an interface response message sent by the DNS server, where the interface response message includes the interface information of the backup MME, and the sending unit 701 is further configured to send, according to the interface information of the backup MME, user information of UE attached to the MME to the backup MME.

Further, the determining unit 703 is configured to sort the MMECs of all the MMEs in the MME pool according to an ascending order of the MMECs to obtain a sorting result, and set an MME corresponding to an MMEC that is adjacent to an MMEC of the MME and greater than the MMEC of the MME as the backup MME, and set an MME of which an MMEC is the smallest in the sorting result as the backup MME if the MMEC of the MME is the largest in the sorting result.

Further, the sending unit 701 is configured to send a backup request message to the backup MME using an interface corresponding to the interface information of the backup MME, where the backup request message includes an identity of the UE and the user information of the UE, and the backup request message is used to request the backup MME to back up the user information of the UE.

This embodiment of the present disclosure provides an MME. When the MME needs to back up user information of a UE attached to the MME, the MME queries, from a DNS server using an FQDN, MMEC information of all MMEs in a pool in which the MME is located, acquires information about a backup MME of the MME according to a preset policy, queries information about an available interface of the backup MME from the DNS server, and backs up the user information of the UE to the backup MME using the available interface of the backup MME such that when the MME becomes faulty, another MME in the MME pool acquires the user information of the UE from the backup MME in order to provide a service for the UE. Therefore, a service of the UE can succeed at a time, which resolves a problem that a service redundancy effect is relatively poor.

Figure 8:
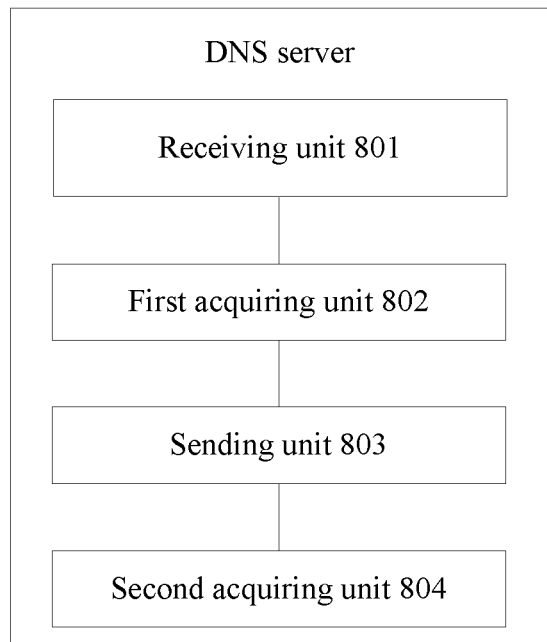
FIG. 8 is a schematic diagram of a DNS server.

To resolve a problem that a service redundancy effect is relatively poor, with reference to FIG. 8, an embodiment of the present disclosure further provides a DNS server, where the DNS server includes a receiving unit 801, a first acquiring unit 802, a sending unit 803, and a second acquiring unit 804, where the receiving unit 801 is configured to receive a request message sent by an MME, where the request message includes a pool identity of an MME pool in which the MME is located, and the request message is used to request to acquire MMECs of all MMEs in the MME pool, the first acquiring unit 802 is configured to acquire, according to the pool identity of the MME pool, the MMECs of all the MMEs in the MME pool corresponding to the pool identity of the MME pool, and the sending unit 803 is configured to send a request response message to the MME, where the request response message includes the MMECs of all the MMEs such that the MME determines a backup MME of the MME according to the MMECs of all the MMEs.

The receiving unit 801 is further configured to receive an interface request message sent by the MME, where the interface request message includes an MMEC of the backup MME and the pool identity of the MME pool, and the interface request message is used to request to acquire interface information of the backup MME, the second acquiring unit 804 is configured to acquire the interface information of the backup MME according to the MMEC of the backup MME and the pool identity of the MME pool, and the sending unit 803 is configured to send an interface response message to the MME, where the interface response message includes the interface information of the backup MME such that the MME sends, according to the interface information of the backup MME, user information of UE attached to the MME to the backup MME.

This embodiment of the present disclosure provides a DNS server. MMEC information of all MMEs in an MME pool and information about available interfaces of all the MMEs are pre-configured in the DNS server. When an MME in the MME pool needs to back up user information of a UE attached to the MME, the MME queries, from the DNS server using an FQDN, the MMEC information of all the MMEs in the MME pool in which the MME is located, and acquires, using a preset policy, information about a backup MME of the MME according to the MMEC information of all the MMEs, and queries information about an available interface of the backup MME from the DNS server, and backs up the user information of the UE to the backup MME using the available interface of the backup MME such that when the MME becomes faulty, another MME in the MME pool acquires the user information of the UE from the backup MME in order to provide a service for the UE. Therefore, a service of the UE can succeed at a time, which resolves a problem in the other approaches that a service redundancy effect is relatively poor.

Figure 9:
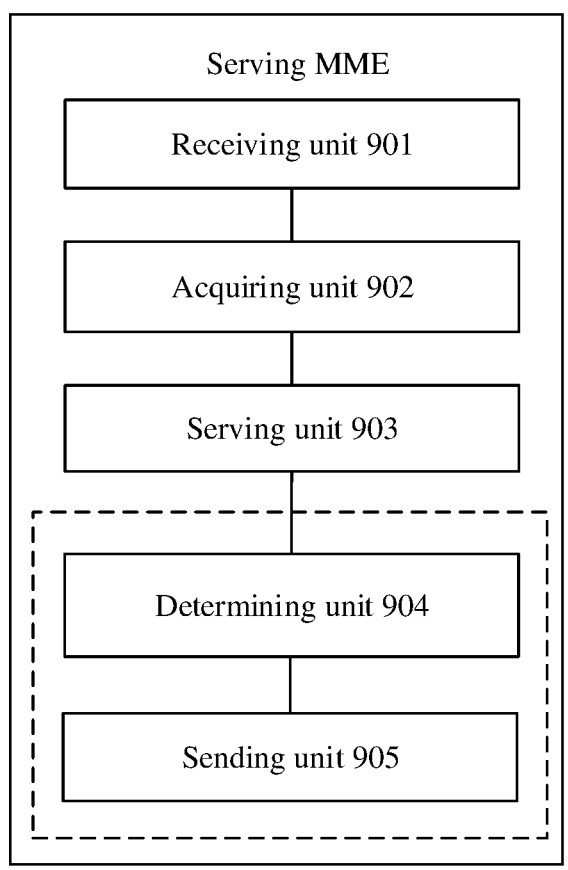
FIG. 9 is a schematic diagram 1 of a serving MME.

To resolve a problem in the other approaches that a service redundancy effect is relatively poor, with reference to FIG. 9, an embodiment of the present disclosure further provides a serving MME, where the MME includes a receiving unit 901, an acquiring unit 902, and a serving unit 903, where the receiving unit 901 is configured to receive a service request message sent by the UE using an eNodeB after an MME to which UE is attached becomes faulty, where the service request message includes an identity of the UE and an identity of the MME to which the UE is attached, the service request message is used to request the MME to which the UE is attached to provide a service for the UE, the serving MME is an MME selected, after the MME to which the UE is attached becomes faulty, by the eNodeB to provide a service for the UE, and the MME to which the UE is attached and the serving MME are located in a same MME pool, the acquiring unit 902 is configured to acquire user information of the UE according to the identity of the UE or according to the identity of the UE and the identity of the MME to which the UE is attached, and the serving unit 903 is configured to provide, according to the user information of the UE, the service corresponding to the service request message for the UE.

Optionally, the receiving unit 901 is further configured to receive the user information of the UE and the identity of the UE that are sent by the MME to which the UE is attached, and record a correspondence between the user information of the UE and the identity of the UE, and the acquiring unit 902 is further configured to acquire, according to the identity of the UE, the user information that is of the UE and saved by the serving MME.

The acquiring unit 902 is further configured to acquire, according to the identity of the MME to which the UE is attached, interface information of a backup MME of the MME to which the UE is attached, and acquire, from the backup MME, the user information of the UE according to the identity of the UE and the interface information of the backup MME, where the backup MME and the serving MME are located in a same MME pool.

Further, the identity of the MME to which the UE is attached is an MMEC of the MME to which the UE is attached, and the acquiring unit 902 is further configured to send a request message to a DNS server, where the request message includes a pool identity of an MME pool in which the serving MME is located, and the request message is used to request to acquire MMECs of all MMEs in the MME pool, receive a request response message sent by the DNS server, where the request response message includes the MMECs of all the MMEs in the MME pool, acquire, according to the MMEC of the MME to which the UE is attached and the MMECs of all the MMEs and according to a preset policy, the backup MME of the MME to which the UE is attached, send an interface request message to the DNS server, where the interface request message includes an MMEC of the backup MME and the pool identity of the MME pool such that the DNS server acquires the interface information of the backup MME according to the pool identity of the MME pool and the MMEC of the backup MME, and receive an interface response message sent by the DNS server, where the interface response message includes the interface information of the backup MME.

Further, the service request message is a VoLTE mobile originated service request message of the UE, or a CSFB request message of the UE, or a 1×CSFB request message of the UE, and the identity of the MME to which the UE is attached is the MMEC of the MME to which the UE is attached, or the service request message is a TAU request message of the UE, and the identity of the MME to which the UE is attached is a GUTI allocated to the UE by the MME to which the UE is attached, where the GUTI includes the MMEC of the MME to which the UE is attached.

Further, the identity of the UE is an S-TMSI of the UE.

The serving MME further includes a determining unit 904 and a sending unit 905, where the determining unit 904 is configured to determine, according to the user information of the UE, that the UE is an authorized user, and the sending unit 905 is configured to separately send a modification request message to an SGW and an HSS that are connected to the MME, where the modification request message includes the identity of the UE, and the modification request message is used to request the SGW or the HSS to modify a correspondence between the UE and the MME to which the UE is attached to a correspondence between the UE and the serving MME, and reallocate a GUTI to the UE, and send the reallocated GUTI to the UE such that the UE is attached to the serving MME.

This embodiment of the present disclosure provides the serving MME. After an MME to which a UE is attached becomes faulty, and a base station that provides a service for the UE detects the fault, the base station sends a service request message of the UE to the MME. When the MME is a backup MME of the MME to which the UE is attached, the MME acquires user information of the UE from storage space of the MME itself according to identity information of the UE. If the MME is not the backup MME of the MME to which the UE is attached, the MME acquires information about the backup MME of the MME to which the UE is attached, and requests the user information of the UE from the backup MME, where the MME provides a service for the UE according to the user information of the UE such that a service of the UE can succeed at a time, and an effect of avoiding HSS congestion is reached by delaying sending a registration request to an HSS, which resolves a problem that a service redundancy effect is relatively poor.

Figure 10:
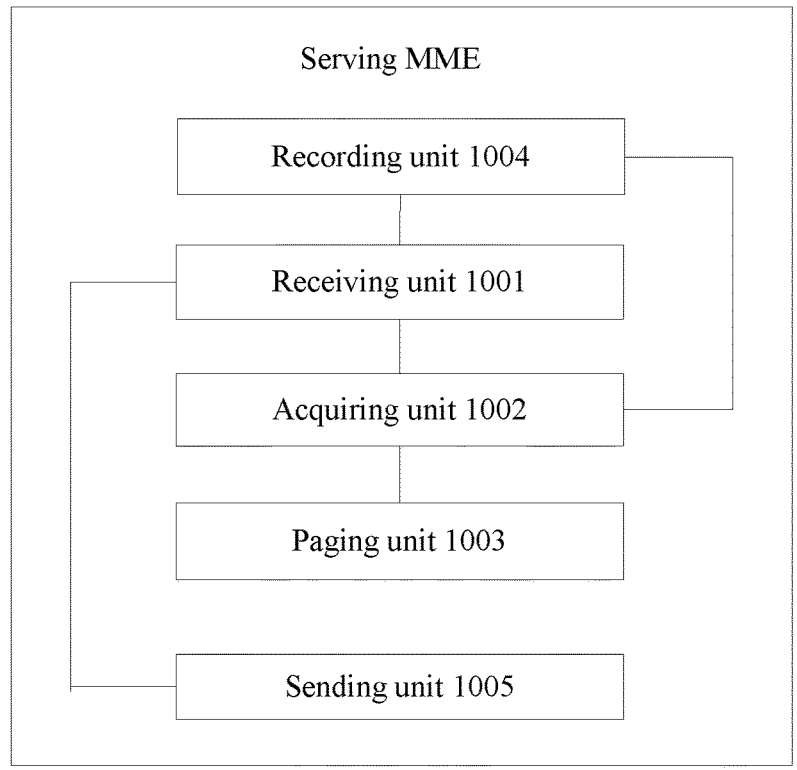
FIG. 10 is a schematic diagram 2 of a serving MME.

To resolve a problem that a service redundancy effect is relatively poor, with reference to FIG. 10, an embodiment of the present disclosure further provides a serving MME, where the serving MME includes a receiving unit 1001, an acquiring unit 1002, and a paging unit 1003, where the receiving unit 1001 is configured to receive a paging request message sent by a network element of a core network in a CS domain that is in a 2G network or a 3G network after an MME to which UE is attached becomes faulty, where the paging request message includes an identity of the UE, the paging request message is used to request to initiate CSFB paging or 1×CSFB paging on the UE, the serving MME is an MME that provides a service for the UE when the MME to which the UE is attached becomes faulty, and the MME to which the UE is attached and the serving MME are located in a same MME pool, the acquiring unit 1002 is configured to acquire user information of the UE according to the identity of the UE, and the paging unit 1003 is configured to acquire, according to the user information, a tracking area in which the UE is located, and initiate a paging request in the tracking area.

Optionally, the serving MME further includes a recording unit 1004, where the receiving unit 1001 is further configured to receive the user information of the UE and the identity of the UE that are sent by the MME to which the UE is attached. The recording unit 1004 is configured to record a correspondence between the user information of the UE and the identity of the UE, and the acquiring unit 1002 is configured to acquire, according to the identity of the UE, the user information that is of the UE and saved by the serving MME.

The serving MME further includes a sending unit 1005, where the sending unit 1005 is configured to send a broadcast request message to all MMEs in the MME pool, where the broadcast request message includes the identity of the UE, and the broadcast request message is used to request to acquire the user information of the UE, and the receiving unit 1001 is further configured to receive a broadcast response message of a backup MME of the MME to which the UE is attached, where the broadcast response message includes the user information of the UE.

This embodiment of the present disclosure provides an MME. After a UE is used as a called user of CSFB/1×CSFB, and an MME to which the UE is attached becomes faulty, a network element in a CS domain in a 2G/3G network to which the UE falls back sends a paging request message to the MME. The MME acquires user information of the UE from the MME itself or from a backup MME of the MME to which the UE is attached, acquires information about a tracking area of the UE from the user information of the UE, and initiates a paging procedure in the tracking area such that a CSFB/1×CSFB mobile terminated call service of the UE succeeds at a time, which resolves a problem that a service redundancy effect is relatively poor.

Figure 11:
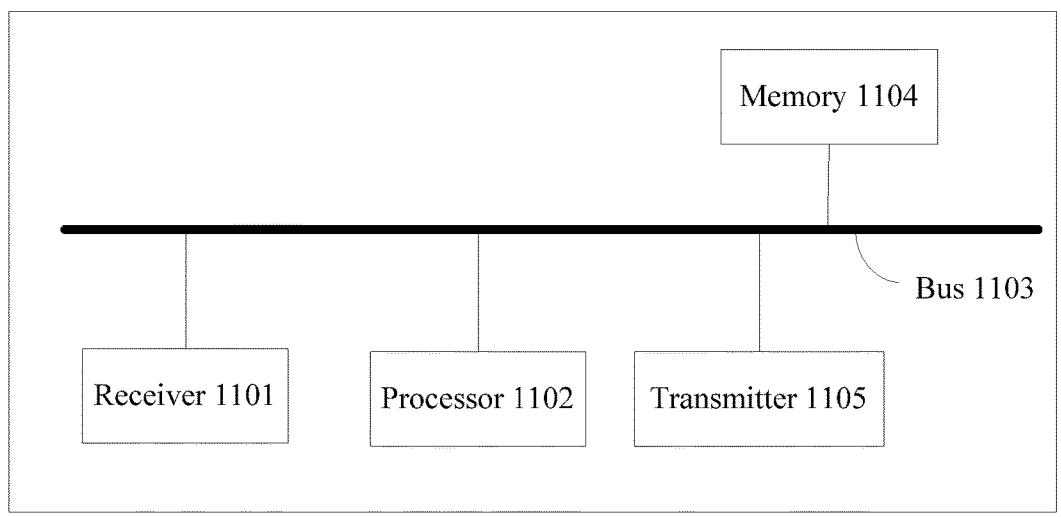
FIG. 11 is a schematic diagram of another MME, DNS server, or serving MME.

To resolve a problem that a service redundancy effect is relatively poor, with reference to FIG. 11, an embodiment of the present disclosure further provides an MME, where the MME includes a transmitter 1105, a processor 1102, a bus 1103, a memory 1104, and a receiver 1101, where the transmitter 1105 is configured to send a request message to a DNS server, where the request message includes a pool identity of an MME pool in which the MME is located, and the request message is used to request to acquire MMECs of all MMEs in the MME pool, the receiver 1101 is configured to receive a request response message sent by the DNS server, where the request response message includes the MMECs of all the MMEs in the MME pool, and the processor 1102 obtains an instruction in the memory 1104 using the bus 1103 in order to determine a backup MME of the MME according to the MMECs of all the MMEs in the MME pool and according to a preset policy.

The transmitter 1105 is further configured to send an interface request message to the DNS server, where the interface request message includes an MMEC of the backup MME and the pool identity of the MME pool, and the interface request message is used to request to acquire interface information of the backup MME, the receiver 1101 is further configured to receive an interface response message sent by the DNS server, where the interface response message includes the interface information of the backup MME, and the processor 1102 is further configured to send, according to the interface information of the backup MME using the transmitter 1105, user information of UE attached to the MME to the backup MME.

Further, the processor 1102 is configured to sort the MMECs of all the MMEs in the MME pool according to an ascending order of the MMECs to obtain a sorting result, and set an MME corresponding to an MMEC that is adjacent to an MMEC of the MME and greater than the MMEC of the MME as the backup MME, and set an MME of which an MMEC is the smallest in the sorting result as the backup MME if the MMEC of the MME is the largest in the sorting result.

Further, the processor 1102 is configured to send, using the transmitter 1105, a backup request message to the backup MME using an interface corresponding to the interface information of the backup MME, where the backup request message includes an identity of the UE and the user information of the UE, and the backup request message is used to request the backup MME to back up the user information of the UE.

This embodiment of the present disclosure provides an MME. When the MME needs to back up user information of a UE attached to the MME, the MME queries, from a DNS server using an FQDN, MMEC information of all MMEs in a pool in which the MME is located, acquires information about a backup MME of the MME according to a preset policy, queries information about an available interface of the backup MME from the DNS server, and backs up the user information of the UE to the backup MME using the available interface of the backup MME such that when the MME becomes faulty, another MME in the MME pool acquires the user information of the UE from the backup MME in order to provide a service for the UE. Therefore, a service of the UE can succeed at a time, which resolves a problem that a service redundancy effect is relatively poor.

To resolve a problem that a service redundancy effect is relatively poor, with reference to FIG. 11, an embodiment of the present disclosure further provides a DNS server, where the DNS server includes a receiver 1101, a processor 1102, a bus 1103, a memory 1104, and a transmitter 1105, where the receiver 1101 is configured to receive a request message sent by an MME, where the request message includes a pool identity of an MME pool in which the MME is located, and the request message is used to request to acquire MMECs of all MMEs in the MME pool, the processor 1102 acquires an instruction in the memory 1104 using the bus 1103 in order to acquire, according to the pool identity of the MME pool, the MMECs of all the MMEs in the MME pool corresponding to the pool identity of the MME pool, and the transmitter 1105 is configured to send a request response message to the MME, where the request response message includes the MMECs of all the MMEs such that the MME determines a backup MME of the MME according to the MMECs of all the MMEs.

The receiver 1101 is further configured to receive an interface request message sent by the MME, where the interface request message includes an MMEC of the backup MME and the pool identity of the MME pool, and the interface request message is used to request to acquire interface information of the backup MME, the processor 1102 is further configured to acquire the interface information of the backup MME according to the MMEC of the backup MME and the pool identity of the MME pool, and the transmitter 1105 is further configured to send an interface response message to the MME, where the interface response message includes the interface information of the backup MME such that the MME sends, according to the interface information of the backup MME, user information of UE attached to the MME to the backup MME.

This embodiment of the present disclosure provides a DNS server. MMEC information of all MMEs in an MME pool and information about available interfaces of all the MMEs are pre-configured in the DNS server. When an MME in the MME pool needs to back up user information of a UE attached to the MME, the MME queries, from the DNS server using an FQDN, the MMEC information of all the MMEs in the MME pool in which the MME is located, and acquires, using a preset policy, information about a backup MME of the MME according to the MMEC information of all the MMEs, and queries information about an available interface of the backup MME from the DNS server, and backs up the user information of the UE to the backup MME using the available interface of the backup MME such that when the MME becomes faulty, another MME in the MME pool acquires the user information of the UE from the backup MME in order to provide a service for the UE. Therefore, a service of the UE can succeed at a time, which resolves a problem that a service redundancy effect is relatively poor.

To resolve a problem that a service redundancy effect is relatively poor, with reference to FIG. 11, an embodiment of the present disclosure further provides a serving MME, where the serving MME includes a receiver 1101, a processor 1102, a bus 1103, and a memory 1104, where the receiver 1101 is configured to receive a service request message sent by the UE using an eNodeB after an MME to which UE is attached becomes faulty, where the service request message includes an identity of the UE and an identity of the MME to which the UE is attached, the service request message is used to request the MME to which the UE is attached to provide a service for the UE, the serving MME is an MME selected, after the MME to which the UE is attached becomes faulty, by the eNodeB to provide a service for the UE, and the MME to which the UE is attached and the serving MME are located in a same MME pool, and the processor 1102 acquires an instruction in the memory 1104 using the bus 1103 in order to acquire user information of the UE according to the identity of the UE or according to the identity of the UE and the identity of the MME to which the UE is attached, and provide, according to the user information of the UE, the service corresponding to the service request message for the UE.

Further, the receiver 1101 is further configured to receive the user information of the UE and the identity of the UE that are sent by the MME to which the UE is attached, and the processor 1102 is further configured to record a correspondence between the user information of the UE and the identity of the UE, and acquire, according to the identity of the UE, the user information that is of the UE and saved by the serving MME.

Further, the processor 1102 is configured to acquire, according to the identity of the MME to which the UE is attached, interface information of a backup MME of the MME to which the UE is attached, and acquire, from the backup MME, the user information of the UE according to the identity of the UE and the interface information of the backup MME, where the backup MME and the serving MME are located in a same MME pool.

Further, the identity of the MME to which the UE is attached is an MMEC of the MME to which the UE is attached, and the serving MME further includes a transmitter 1105, where the transmitter 1105 is configured to send a request message to a DNS server, where the request message includes a pool identity of an MME pool in which the serving MME is located, and the request message is used to request to acquire MMECs of all MMEs in the MME pool. The receiver 1101 is configured to receive a request response message sent by the DNS server, where the request response message includes the MMECs of all the MMEs in the MME pool. The processor 1102 is configured to acquire, according to the MMEC of the MME to which the UE is attached and the MMECs of all the MMEs and according to a preset policy, the backup MME of the MME to which the UE is attached. The transmitter 1105 is further configured to send an interface request message to the DNS server, where the interface request message includes an MMEC of the backup MME and the pool identity of the MME pool such that the DNS server acquires interface information of the backup MME according to the pool identity of the MME pool and the MMEC of the backup MME, and the receiver 1101 is further configured to receive an interface response message sent by the DNS server, where the interface response message includes the interface information of the backup MME.

Further, the service request message is a VoLTE mobile originated service request message of the UE, a CSFB request message of the UE, or a 1×CSFB request message of the UE, and the identity of the MME to which the UE is attached is the MMEC of the MME to which the UE is attached, or the service request message is a TAU request message of the UE, and the identity of the MME to which the UE is attached is a GUTI allocated to the UE by the MME to which the UE is attached, where the GUTI includes the MMEC of the MME to which the UE is attached.

Further, the identity of the UE is an S-TMSI of the UE.

Further, the processor 1102 is further configured to determine, according to the user information of the UE, that the UE is an authorized user.

The transmitter 1105 is further configured to separately send a modification request message to an SGW and an HSS that are connected to the MME, where the modification request message includes the identity of the UE, and the modification request message is used to request the SGW or the HSS to modify a correspondence between the UE and the MME to which the UE is attached to a correspondence between the UE and the serving MME, and the processor 1102 is further configured to reallocate a GUTI to the UE, and send the reallocated GUTI to the UE using the transmitter 1105 such that the UE is attached to the serving MME.

This embodiment of the present disclosure provides the serving MME. After an MME to which a UE is attached becomes faulty, and a base station that provides a service for the UE detects the fault, the base station sends a service request message of the UE to the serving MME. When the MME is a backup MME of the MME to which the UE is attached, the MME acquires user information of the UE from storage space of the MME itself according to identity information of the UE. If the MME is not the backup MME of the MME to which the UE is attached, the MME acquires information about the backup MME of the MME to which the UE is attached, and requests the user information of the UE from the backup MME, where the MME provides a service for the UE according to the user information of the UE such that a service of the UE can succeed at a time, and an effect of avoiding HSS congestion is reached by delaying sending a registration request to an HSS, which resolves a problem in the other approaches that a service redundancy effect is relatively poor.

To resolve a problem in the other approaches that a service redundancy effect is relatively poor, with reference to FIG. 11, an embodiment of the present disclosure further provides an MME, where the MME includes a receiver 1101, a processor 1102, a bus 1103, a memory 1104, and a transmitter 1105, where the receiver 1101 is configured to receive a paging request message sent by a network element of a core network in a CS domain that is in a 2G network or a 3G network after an MME to which UE is attached becomes faulty, where the paging request message includes an identity of the UE, the paging request message is used to request to initiate CSFB paging or 1×CSFB paging on the UE, the serving MME is an MME that provides a service for the UE when the MME to which the UE is attached becomes faulty, and the MME to which the UE is attached and the serving MME are located in a same MME pool, and the processor 1102 acquires an instruction in the memory 1104 using the bus 1103 in order to acquire user information of the UE according to the identity of the UE, and acquire, according to the user information, a tracking area in which the UE is located, and initiate a paging request in the tracking area using the transmitter 1105.

Further, the receiver 1101 is further configured to receive the user information of the UE and the identity of the UE that are sent by the MME to which the UE is attached, and the processor 1102 is further configured to record a correspondence between the user information of the UE and the identity of the UE, and acquire, according to the identity of the UE, the user information that is of the UE and saved by the serving MME.

Further, the transmitter 1105 is further configured to send a broadcast request message to all MMEs in the MME pool, where the broadcast request message includes the identity of the UE, and the broadcast request message is used to request to acquire the user information of the UE.

The receiver 1101 is further configured to receive a broadcast response message of a backup MME of the MME to which the UE is attached, where the broadcast response message includes the user information of the UE.

This embodiment of the present disclosure provides an MME. After a UE is used as a called user of CSFB/1×CSFB, and an MME to which the UE is attached becomes faulty, a network element in a CS domain in a 2G/3G network to which the UE falls back sends a paging request message to the MME. The MME acquires user information of the UE from the MME itself or from a backup MME of the MME to which the UE is attached, acquires information about a tracking area of the UE from the user information of the UE, and initiates a paging procedure in the tracking area such that a CSFB/1×CSFB mobile terminated call service of the UE succeeds at a time, which resolves a problem in the other approaches that a service redundancy effect is relatively poor.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service redundancy method, comprising:
    sending, by a mobility management entity (MME), a request message to a domain name system (DNS) server, wherein the request message comprises a pool identity of an MME pool in which the MME is located, and wherein the request message requests to acquire MME codes (MMECs) of all MMEs in the MME pool;
    receiving, by the MME, a request response message from the DNS server, wherein the request response message comprises the MMECs of all the MMEs in the MME pool;
    determining, by the MME, a backup MME of the MME according to the MMECs of all the MMEs in the MME pool and a preset policy;
    sending, by the MME, an interface request message to the DNS server, wherein the interface request message comprises an MMEC of the backup MME and the pool identity of the MME pool, and wherein the interface request message requests interface information of the backup MME;
    receiving, by the MME, an interface response message from the DNS server, wherein the interface response message comprises the interface information of the backup MME; and
    sending, by the MME according to the interface information of the backup MME, user information of user equipment (UE) attached to the MME to the backup MME.

2. The method according to claim 1, wherein determining the backup MME of the MME comprises:
    sorting, by the MME, the MMECs of all the MMEs in the MME pool according to an ascending order of the MMECs to obtain a sorting result;

setting, by the MME, a first MME corresponding to an MMEC adjacent to an MMEC of the MME and greater than the MMEC of the MME as the backup MME; and setting, by the MME, a second MME of which an MMEC is the smallest in the sorting result as the backup MME when the MMEC of the MME is the largest in the sorting result.

3. The method according to claim 1, wherein sending the user information of the UE attached to the MME to the backup MME comprises sending, by the MME, a backup request message to the backup MME using an interface corresponding to the interface information of the backup MME, wherein the backup request message comprises an identity of the UE and the user information of the UE, and wherein the backup request message requests the backup MME to back up the user information of the UE.

4. A service redundancy method, comprising:
receiving, by a serving mobility management entity (MME), a service request message from user equipment (UE) using an evolved NodeB (eNodeB) after an MME to which the UE is attached becomes faulty, wherein the service request message comprises an identity of the UE and an identity of the MME to which the UE is attached, wherein the service request message requests the MME to which the UE is attached to provide a service for the UE, wherein the serving MME is an MME selected; by the eNodeB to provide the service for the UE after the MME to which the UE is attached becomes faulty, and wherein the MME to which the UE is attached and the serving MME are located in a same MME pool;
acquiring, by the serving MME, user information of the UE from a backup MME determined according to the identity of the UE or according to the identity of the UE and the identity of the MME to which the UE is attached; and
providing, by the serving MME according to the user information of the UE, the service corresponding to the service request message for the UE.

5. The method according to claim 4, wherein before the MME to which the UE is attached becomes faulty, the method further comprises:
receiving, by the serving MME, the user information of the UE and the identity of the UE from the MME to which the UE is attached;
recording, by the serving MME, a correspondence between the user information of the UE and the identity of the UE, and
wherein acquiring the user information of the UE comprises;
determining, by the serving MME according to the identity of the UE, that the user information of the UE is stored in the serving MME and the serving MME is the backup MME; and
acquiring, by the serving MME according to the identity of the UE, the user information of the UE saved by the serving MME.

6. The method according to claim 4, wherein acquiring the user information of the UE comprises:
determining, by the serving MME according to the identity of the UE, that the user information of the UE is not stored in the serving MME and the serving MME is not the backup MME;
acquiring, by the serving MME according to the identity of the MME to which the UE is attached, interface information of the backup MME of the MME to which the UE is attached; and acquiring, from the backup MME, the user information of the UE according to the identity of the UE and the interface information of the backup MME, and
wherein the backup MME and the serving MME are located in the same MME pool.

7. The method according to claim 6, wherein the identity of the MME to which the UE is attached is an MME code (MMEC) of the MME to which the UE is attached, and wherein acquiring the interface information of the backup MME of the MME to which the UE is attached comprises:
sending, by the serving MME, a request message to a domain name system (DNS) server, wherein the request message comprises a pool identity of an MME pool in which the serving MME is located, and wherein the request message requests to acquire MME codes (MMECs) of all MMEs in the MME pool;
receiving, by the serving MME, a request response message from the DNS server, wherein the request response message comprises the MMECs of all the MMEs in the MME pool;
acquiring, by the serving MME according to the MMEC of the MME to which the UE is attached and the MMECs of all the MMEs and according to a preset policy, the backup MME of the MME to which the UE is attached;
sending, by the serving MME, an interface request message to the DNS server, wherein the interface request message comprises an MMEC of the backup MME and the pool identity of the MME pool such that the DNS server acquires the interface information of the backup MME according to the pool identity of the MME pool and the MMEC of the backup MME; and
receiving, by the serving MME, an interface response message from the DNS server, and wherein the interface response message comprises the interface information of the backup MME.

8. The method according to claim 4, wherein the identity of the MME to which the UE is attached is an MME code (MMEC) of the MME to which the UE is attached.

9. The method according to claim 4, wherein the service request message is a tracking area update (TAU) request message of the UE, wherein the identity of the MME to which the UE is attached is a globally unique temporary identity (GUTI) allocated to the UE by the MME to which the UE is attached, and wherein the GUTI comprises an MME code MMEC of the MME to which the UE is attached.

10. The method according to claim 4, wherein after acquiring the user information of the UE, the method further comprises:
determining, by the serving MME according to the user information of the UE, that the UE is an authorized user;
separately sending, by the serving MME, a modification request message to a serving gateway (SGW) and a home subscriber server (HSS) connected to the serving MME, wherein the modification request message comprises the identity of the UE, and wherein the modification request message requests the SGW and the HSS to modify a correspondence between the UE and the MME to which the UE is attached to a correspondence between the UE and the serving MME;
reallocating, by the serving MME, a globally unique temporary identity (GUTI) to the UE; and
sending, by the serving MME, the reallocated GUTI to the UE such that the UE is attached to the serving MME.

11. A mobility management entity (MME), comprising:
a transmitter configured to send a request message to a domain name system (DNS) server, wherein the request message comprises a pool identity of an MME pool in which the MME is located, and wherein the request message requests to acquire MME codes (MMECs) of all MMEs in the MME pool;
a receiver configured to receive a request response message from the DNS server, wherein the request response message comprises the MMECs of all the MMEs in the MME pool; and
a processor coupled to the transmitter and the receiver and configured to determine a backup MME of the MME according to the MMECs of all the MMEs in the MME pool and a preset policy,
wherein the transmitter is further configured to send an interface request message to the DNS server,
wherein the interface request message comprises an MMEC of the backup MME and the pool identity of the MME pool,
wherein the interface request message requests interface information of the backup MME,
wherein the receiver is further configured to receive an interface response message from the DNS server,
wherein the interface response message comprises the interface information of the backup MME, and
wherein the transmitter is further configured to send, according to the interface information of the backup MME, user information of user equipment (UE) attached to the MME to the backup MME.

12. The MME according to claim 11, wherein the processor is further configured to:
sort the MMECs of all the MMEs in the MME pool according to an ascending order of the MMECs to obtain a sorting result;
set a first MME corresponding to an MMEC adjacent to an MMEC of the MME and greater than the MMEC of the MME as the backup MME; and
set a second MME of which an MMEC is the smallest in the sorting result as the backup MME when the MMEC of the MME is the largest in the sorting result.

13. The MME according to claim 11, wherein the transmitter is further configured to send a backup request message to the backup MME using an interface corresponding to the interface information of the backup MME, wherein the backup request message comprises an identity of the UE and the user information of the UE, and wherein the backup request message requests the backup MME to back up the user information of the UE.

14. A serving mobility management entity (MME), comprising:
a receiver configured to receive a service request message from user equipment (UE) using an evolved NodeB (eNodeB) after an MME to which UE is attached becomes faulty, wherein the service request message comprises an identity of the UE and an identity of the MME to which the UE is attached, wherein the service request message requests the MME to which the UE is attached to provide a service for the UE, wherein the serving MME is an MME selected by the eNodeB to provide the service for the UE after the MME to which the UE is attached becomes faulty, and wherein the MME to which the UE is attached and the serving MME are located in a same MME pool; and
a processor coupled to the receiver and configured to:
acquire user information of the UE from a backup MME determined according to the identity of the UE or according to the identity of the UE and the identity of the MME to which the UE is attached; and
provide, according to the user information of the UE, the service corresponding to the service request message for the UE.

15. The serving MME according to claim 14, wherein the receiver is further configured to receive the user information of the UE and the identity of the UE from the MME to which the UE is attached, and wherein the processor is further configured to:
record a correspondence between the user information of the UE and the identity of the UE;
determine, according to the identity of the UE, that the user information of the UE is stored in the serving MME and the serving MME is the backup MME; and
acquire, according to the identity of the UE, the user information of the UE and saved by the serving MME.

16. The serving MME according to claim 14, wherein the processor is further configured to:
determine, according to the identity of the UE, that the user information of the UE is not stored in the serving MME and the serving MME is not the backup MME;
acquire, according to the identity of the MME to which the UE is attached, interface information of the backup MME of the MME to which the UE is attached; and
acquire, from the backup MME, the user information of the UE according to the identity of the UE and the interface information of the backup MME, and
wherein the backup MME and the serving MME are located in the same MME pool.

17. The serving MME according to claim 16, wherein the identity of the MME to which the UE is attached is an MME code (MMEC) of the MME to which the UE is attached, and wherein the processor is further configured to:
send a request message to a domain name system (DNS) server, wherein the request message comprises a pool identity of an MME pool in which the serving MME is located, and wherein the request message requests to acquire MME codes (MMECs) of all MME in the MME pool;
receive, using the receiver, a request response message from the DNS server, wherein the request response message comprises the MMECs of all the MMEs in the MME pool;
acquire, according to the MMEC of the MME to which the UE is attached and the MMECs of all the MMEs and a preset policy, the backup MME of the MME to which the UE is attached;
send an interface request message to the DNS server, wherein the interface request message comprises an MMEC of the backup MME and the pool identity of the MME pool such that the DNS server acquires the interface information of the backup MME according to the pool identity of the MME pool and the MMEC of the backup MME; and
receive an interface response message from the DNS server, wherein the interface response message comprises the interface information of the backup MME.

18. The serving MME according to claim 14, wherein the identity of the MME to which the UE is attached is an MME code (MMEC) of the MME to which the UE is attached.

19. The serving MME according to claim 14, wherein the service request message is a tracking area update (TAU) request message of the UE, wherein the identity of the MME to which the UE is attached is a globally unique temporary identity (GUTI) allocated to the UE by the MME to which the UE is attached, and wherein the GUTI comprises an MME code (MMEC) of the MME to which the UE is attached.

20. The serving MME according to claim 14, wherein the processor is further configured to:
- determine, according to the user information of the UE, that the UE is an authorized user;
- separately send a modification request message to a serving gateway (SGW) and a home subscriber server (HSS) connected to the serving MME,
- wherein the modification request message comprises the identity of the UE, and
- wherein the modification request message requests the SGW and the HSS to modify a correspondence between the UE and the MME to which the UE is attached to a correspondence between the UE and the serving MME;
- reallocate a globally unique temporary identity (GUTI) to the UE; and
- send the reallocated GUTI to the UE such that the UE is attached to the serving MME.

* * * * *

UNITED STATES PATENT AND TRADEMARK OFFICE
CERTIFICATE OF CORRECTION

PATENT NO. : 10,405,206 B2
APPLICATION NO. : 15/664986
DATED : September 3, 2019
INVENTOR(S) : Yu Fan, Xiaoji Sun and Bo Chen Page 1 of 1

It is certified that error appears in the above-identified patent and that said Letters Patent is hereby corrected as shown below:

In the Claims

Claim 5, Column 27, Line 50: "comprises;" should read "comprises:"

Signed and Sealed this
Eighth Day of October, 2019

Andrei Iancu
*Director of the United States Patent and Trademark Office*